United States Patent
Nakamura et al.

(10) Patent No.: US 11,953,726 B2
(45) Date of Patent: Apr. 9, 2024

(54) OPTICAL DEVICE

(71) Applicant: Panasonic Intellectual Property Management Co., Ltd., Osaka (JP)

(72) Inventors: Kazuki Nakamura, Osaka (JP); Yasuhisa Inada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 17/471,687

(22) Filed: Sep. 10, 2021

(65) Prior Publication Data

US 2021/0405289 A1 Dec. 30, 2021

Related U.S. Application Data

(63) Continuation of application No. PCT/JP2020/004776, filed on Feb. 7, 2020.

(30) Foreign Application Priority Data

Apr. 26, 2019 (JP) ................................. 2019-085428

(51) Int. Cl.
*G02B 6/124* (2006.01)
*G01S 7/481* (2006.01)
(Continued)

(52) U.S. Cl.
CPC ............ *G02B 6/124* (2013.01); *G01S 7/4817* (2013.01); *G01S 17/89* (2013.01);
(Continued)

(58) Field of Classification Search
CPC ... G02B 6/124; G02B 6/12033; G01S 7/4817; G01S 17/89; G02F 1/295; G02F 1/13
See application file for complete search history.

(56) References Cited

U.S. PATENT DOCUMENTS

| 2015/0205196 A1* | 7/2015 | Orihara ..................... G03F 1/24 430/5 |
| 2019/0004393 A1 | 1/2019 | Hashiya et al. |
| 2020/0363596 A1* | 11/2020 | Hashiya ................. G02B 26/08 |

FOREIGN PATENT DOCUMENTS

| JP | 61-144608 | 7/1986 |
| JP | 2013-016591 | 1/2013 |

(Continued)

OTHER PUBLICATIONS

International Search Report of PCT application No. PCT/JP2020/004776 dated Apr. 7, 2020.

*Primary Examiner* — Michael P Mooney
(74) *Attorney, Agent, or Firm* — Rimon P.C.

(57) ABSTRACT

An optical device includes a first waveguide extending in a first direction and a second waveguide connected to the first waveguide. The second waveguide includes a first mirror, a second mirror, and an optical waveguide layer. At least either the first waveguide or the second waveguide has one or more gratings in a part of a connection region in which the first mirror, the second mirror, and the first waveguide overlap one another when seen from an angle parallel with a direction perpendicular to a first reflecting surface of the first mirror. The one or more gratings is at a distance that is longer than at least either a thickness of the first mirror or a thickness of the second mirror in the first direction from an end of the first mirror or the second mirror that is in the connection region.

5 Claims, 13 Drawing Sheets

(51) Int. Cl.
    *G01S 17/89*     (2020.01)
    *G02B 6/12*     (2006.01)
    *G02F 1/295*     (2006.01)

(52) U.S. Cl.
    CPC ......... *G02B 6/12033* (2013.01); *G02F 1/295* (2013.01); *G02B 2006/12104* (2013.01); *G02F 2201/302* (2013.01)

(56) References Cited

FOREIGN PATENT DOCUMENTS

| | | |
|---|---|---|
| JP | 2016-024439 | 2/2016 |
| JP | 2016-508235 | 3/2016 |
| WO | 2013/168266 | 11/2013 |
| WO | 2014/110017 | 7/2014 |
| WO | 2018/061514 | 4/2018 |
| WO | 2019/171806 | 9/2019 |

\* cited by examiner

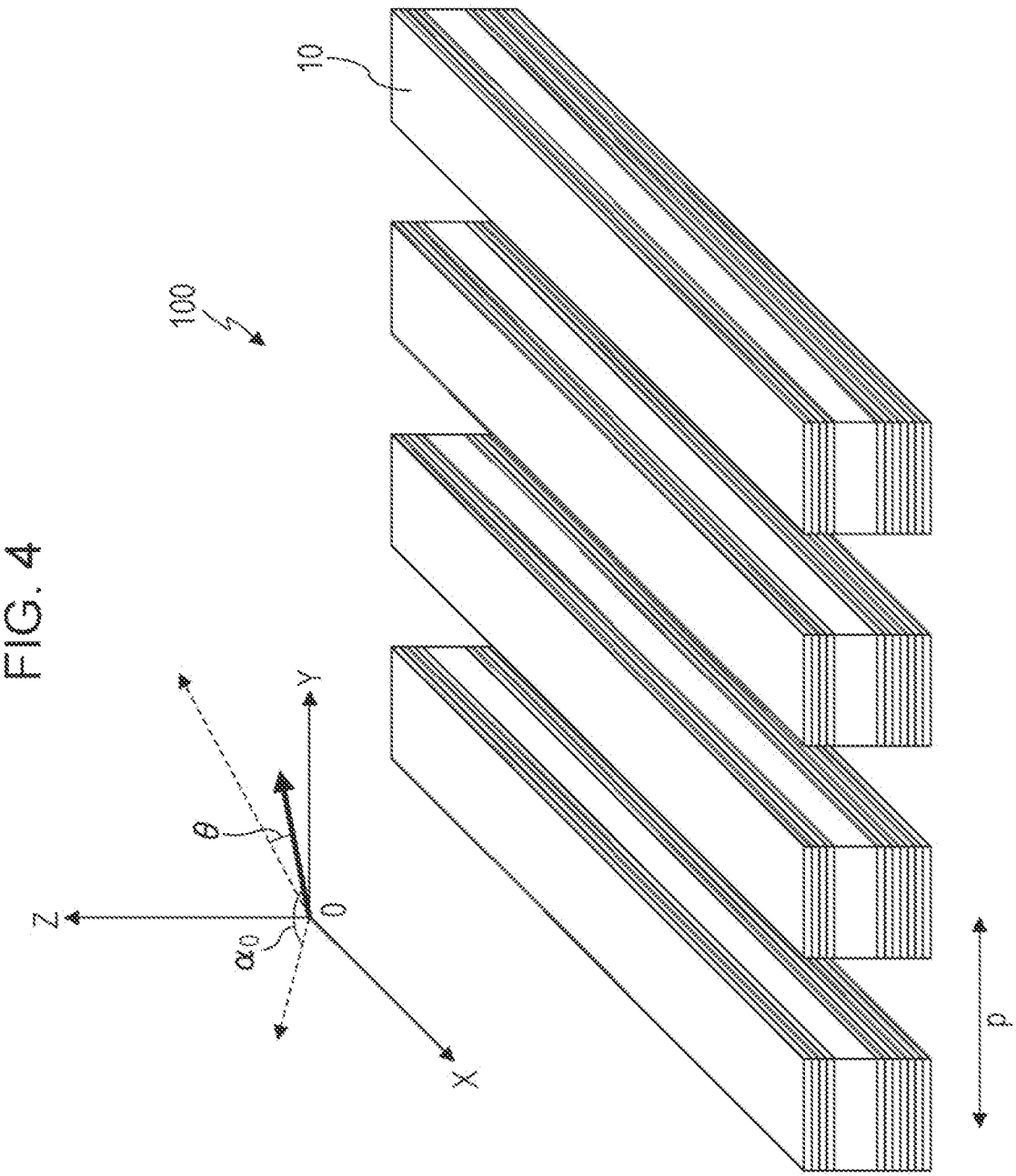

OPTICAL DEVICE

BACKGROUND

1. Technical Field

The present disclosure relates to an optical device.

2. Description of the Related Art

There have conventionally been proposed various types of device that are capable of scanning space with light.

International Publication No. 2013/168266 discloses a configuration in which an optical scan can be performed with a mirror-rotating driving apparatus.

Japanese Unexamined Patent Application Publication (Translation of PCT Application) No. 2016-508235 discloses an optical phased array having a plurality of two-dimensionally arrayed nanophotonic antenna elements. Each antenna element is optically coupled to a variable optical delay line (i.e. a phase shifter). In this optical phased array, a coherent light beam is guided to each antenna element by a waveguide, and the phase of the light beam is shifted by the phase shifter. This makes it possible to vary the amplitude distribution of a far-field radiating pattern.

Japanese Unexamined Patent Application Publication No. 2013-16591 discloses an optical deflection element including: a waveguide including an optical waveguide layer through the inside of which light is guided and first distributed Bragg reflectors formed on upper and lower surfaces, respectively, of the optical waveguide layer; a light entrance through which light enters the waveguide, and a light exit formed on a surface of the waveguide to let out light having entered through the light entrance and being guided through the inside of the waveguide.

International Publication No. 2018/061514 discloses an optical scan device including a first waveguide that propagates light by total reflection and a second waveguide that propagates light between two multilayer reflecting films. The first waveguide and the second waveguide are connected to each other.

SUMMARY

One non-limiting and exemplary embodiment provides a novel optical device that is capable of achieving an optical coupling between waveguides with a comparatively simple configuration.

In one general aspect, the techniques disclosed here feature an optical device including a first waveguide extending in a first direction and a second waveguide connected to the first waveguide. The second waveguide includes a first mirror having a first reflecting surface, a second mirror having a second reflecting surface facing the first reflecting surface, and an optical waveguide layer, sandwiched between the first mirror and the second mirror, that contains a portion of the first waveguide including a leading end. At least either the first waveguide or the second waveguide has one or more gratings in a part of a connection region in which the first mirror, the second mirror, and the first waveguide overlap one another when seen from an angle parallel with a direction perpendicular to the first reflecting surface. The one or more gratings is at a distance that is longer than at least either a thickness of the first mirror or a thickness of the second mirror in the first direction from an end of the first mirror or the second mirror that is in the connection region.

It should be noted that general or specific embodiments may be implemented as a device, a system, a method, or any selective combination thereof.

An aspect of the present disclosure makes it possible to achieve an optical coupling between waveguides with a comparatively simple configuration.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a perspective view schematically showing an example of a waveguide array in a three-dimensional space;

DETAILED DESCRIPTION

Figure 1:
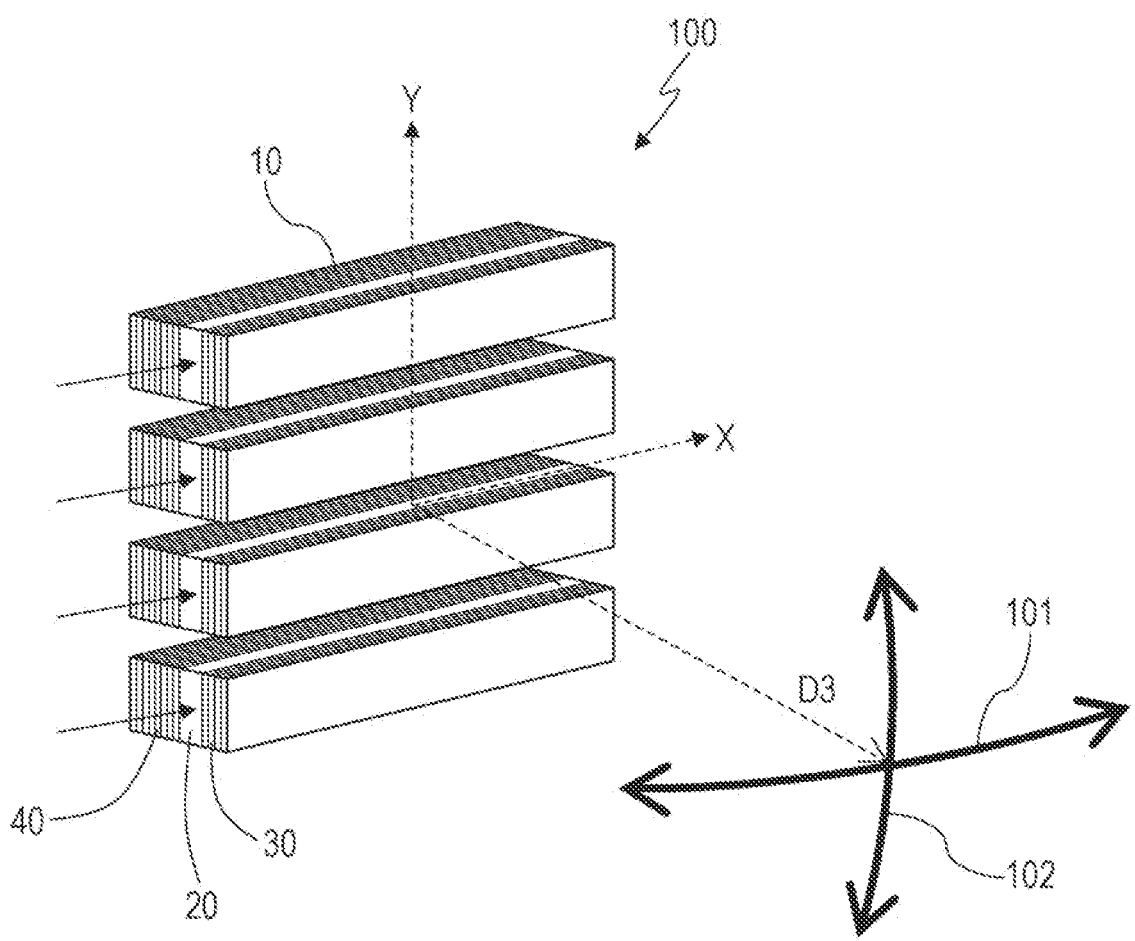
FIG. 1 is a perspective view schematically showing an example of an optical scan device.

The phrase "at least one of the refractive index, the thickness, or the wavelength" herein means at least one selected from the group consisting of the refractive index of an optical waveguide layer, the thickness of an optical waveguide layer, and the wavelength of light that is inputted to an optical waveguide layer. For a change in direction of emission of light, any one of the refractive index, the thickness, and the wavelength may be controlled alone. Alternatively, the direction of emission of light may be changed by controlling any two or all of these three. The wavelength of light that is inputted to the optical waveguide layer may be controlled instead of or in addition to controlling the refractive index or the thickness.

The foregoing fundamental principles are similarly applicable to uses in which optical signals are received as well as uses in which light is emitted. The direction of light that can be received can be one-dimensionally changed by changing at least one of the refractive index, the thickness, or the wavelength. Furthermore, the direction of light that can be received can be two-dimensionally changed by changing a phase difference of light through a plurality of phase shifters connected separately to each of a plurality of unidirectionally-arrayed waveguide elements.

An optical scan device and an optical receiver device of the present disclosure may be used, for example, as an antenna in a photodetection system such as a LiDAR (light detection and raging) system. The LiDAR system, which involves the use of short-wavelength electromagnetic waves (visible light, infrared radiation, or ultraviolet radiation), can detect a distance distribution of objects with higher resolution than a radar system that involves the use of radio waves such as millimeter waves. Such a LiDAR system is mounted, for example, on a movable body such as an automobile, a UAV (unmanned aerial vehicle, i.e. a drone), or an AGV (automated guided vehicle), and may be used as one of the crash avoidance technologies. The optical scan device and the optical receiver device are herein sometimes collectively referred to as "optical device". Further, a device that is used in the optical scan device or the optical receiver device is sometimes referred to as "optical device", too.

Example Configuration of Optical Scan Device

The following describes, as an example, a configuration of an optical scan device that performs a two-dimensional scan. Note, however, that an unnecessarily detailed description may be omitted. For example, a detailed description of a matter that is already well known and a repeated description of substantially the same configuration may be omitted. This is intended to facilitate understanding of persons skilled in the art by avoiding making the following description unnecessarily redundant. It should be noted that the inventors provide the accompanying drawings and the following description for persons skilled in the art to fully understand the present disclosure and do not intend to limit the subject matter recited in the claims. In the following description, identical or similar constituent elements are given the same reference numerals.

In the present disclosure, the term "light" means electromagnetic waves including ultraviolet radiation (ranging from approximately 10 nm to approximately 400 nm in wavelength) and infrared radiation (ranging from approximately 700 nm to approximately 1 mm in wavelength) as well as visible light (ranging approximately 400 nm to approximately 700 nm in wavelength). Ultraviolet radiation is herein sometimes referred to as "ultraviolet light", and infrared radiation is herein sometimes referred to as "infrared light".

In the present disclosure, an optical "scan" means changing the direction of light. A "one-dimensional scan" means changing the direction of light along a direction that intersects the direction. A "two-dimensional scan" means two-dimensionally changing the direction of light along a plane that intersects the direction.

FIG. 1 is a perspective view schematically showing an example of an optical scan device 100. The optical scan device 100 includes a waveguide array including a plurality of waveguide elements 10. Each of the plurality of waveguide elements 10 has a shape extending in a first direction (in FIG. 1, an X direction). The plurality of waveguide elements 10 are regularly arrayed in a second direction (in FIG. 1, a Y direction) that intersects the first direction. The plurality of waveguide elements 10, while propagating light in the first direction, emit the light in a third direction D3 that intersects an imaginary plane parallel to the first and second directions. Although, in the present disclosure, the first direction (X direction) and the second direction (Y direction) are orthogonal to each other, they may not be orthogonal to each other. Although, in the present disclosure, the plurality of waveguide elements 10 are placed at equal spacings in the Y direction, they do not necessarily need to be placed at equal spacings.

It should be noted that the orientation of a structure shown in a drawing of the present disclosure is set in view of understandability of explanation and is in no way intended to restrict any actual orientation whatsoever. Further, the shape and size of the whole or a part of a structure shown in a drawing are not intended to restrict an actual shape and size.

Each of the plurality of waveguide elements 10 has first and second mirrors 30 and 40 (each hereinafter sometimes referred to simply as "mirror") facing each other and an optical waveguide layer 20 located between the mirror 30 and the mirror 40. Each of the mirrors 30 and 40 has a reflecting surface, situated at the interface with the optical waveguide layer 20, that intersects the third direction D3. The mirror 30, the mirror 40, and the optical waveguide layer 20 have shapes extending in the first direction (X direction).

As will be mentioned later, a plurality of the first mirrors 30 of the plurality of waveguide elements 10 may be a plurality of portions of a mirror of integral construction. Further, a plurality of the second mirrors 40 of the plurality of waveguide elements 10 may be a plurality of portions of a mirror of integral construction. Furthermore, a plurality of the optical waveguide layers 20 of the plurality of waveguide elements 10 may be a plurality of portions of an optical waveguide layer of integral construction. A plurality of waveguides can be formed by at least (1) each first mirror 30 being constructed separately from another first mirror 30, (2) each second mirror 40 being constructed separately from another second mirror 40, or (3) each optical waveguide layer 20 being constructed separately from another optical waveguide layer 20. The phrase "being constructed separately" encompasses not only physically providing space but also separating first mirrors 30, second mirrors 40, or optical waveguide layers 20 from each other by placing a material of a different refractive index between them.

The reflecting surface of the first mirror 30 and the reflecting surface of the second mirror 40 face each other substantially in a parallel fashion. Of the two mirrors 30 and 40, at least the first mirror 30 has the property of transmitting a portion of light propagating through the optical waveguide layer 30. In other words, the first mirror 30 has a higher light transmittance against the light than the second mirror 40. For this reason, a portion of light propagating through the optical waveguide layer 20 is emitted outward from the first mirror 30. Such mirrors 30 and 40 may for example be multilayer mirrors that are formed by multilayer films of dielectrics (sometimes referred to as "multilayer reflective films").

An optical two-dimensional scan can be achieved by controlling the phases of lights that are inputted to the respective waveguide elements 10 and, furthermore, causing the refractive indices or thicknesses of the optical waveguide layers 20 of these waveguide elements 10 or the wavelengths of lights that are inputted to the optical waveguide layers 20 to simultaneously change in synchronization.

In order to achieve such a two-dimensional scan, the inventors conducted an analysis on the principle of operation of a waveguide element 10. As a result of their analysis, the inventors succeeded in achieving an optical two-dimensional scan by driving a plurality of waveguide elements 10 in synchronization.

As shown in FIG. 1, inputting light to each waveguide element 10 causes light to exit the waveguide element 10 through an exit surface of the waveguide element 10. The exit face is located on the side opposite to the reflecting surface of the first mirror 30. The direction D3 of the emitted light depends on the refractive index and thickness of the optical waveguide layer and the wavelength of light. In the present disclosure, at least one of the refractive index of each optical waveguide layer, the thickness of each optical waveguide layer, or the wavelength is controlled in synchronization so that lights that are emitted separately from each waveguide element 10 are oriented in substantially the same direction. This makes it possible to change X-direction components of the wave number vectors of lights that are emitted from the plurality of waveguide elements 10. In other words, this makes it possible to change the direction D3 of the emitted light along a direction 101 shown in FIG. 1.

Furthermore, since the lights that are emitted from the plurality of waveguide elements 10 are oriented in the same direction, the emitted lights interfere with one another. By controlling the phases of the lights that are emitted from the respective waveguide elements 10, a direction in which the lights reinforce one another by interference can be changed. For example, in a case where a plurality of waveguide elements 10 of the same size are placed at equal spacings in the Y direction, lights differing in phase by a constant amount from one another are inputted to the plurality of waveguide elements 10. By changing the phase differences, Y-direction components of the wave number vectors of the emitted lights can be changed. In other words, by varying phase differences among lights that are introduced into the plurality of waveguide elements 10, the direction D3, in which the emitted lights reinforce one another by interference, can be changed along a direction 102 shown in FIG. 1. This makes it possible to achieve an optical two-dimensional scan.

The following describes the principle of operation of the optical scan device 100.

Principle of Operation of Waveguide Element

Figure 2:
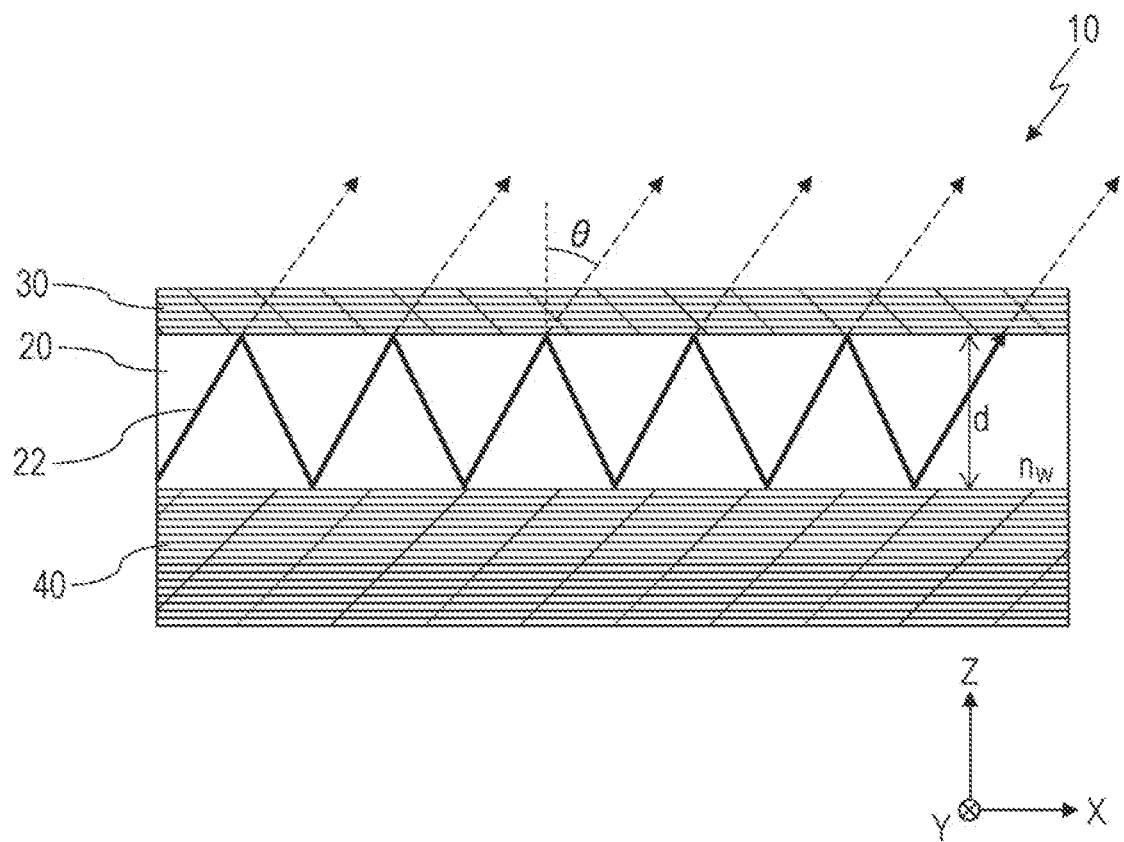
FIG. 2 is a diagram schematically showing an example of a cross-section structure of one waveguide element and an example of propagating light.

FIG. 2 is a diagram schematically showing an example of a cross-section structure of one waveguide element 10 and an example of propagating light. With a Z direction being a direction perpendicular of the X and Y directions shown in FIG. 1, FIG. 2 schematically shows a cross-section parallel to an X-Z plane of the waveguide element 10. The waveguide element 10 is configured such that the pair of mirrors 30 and 40 are disposed so as to hold the optical waveguide layer 20 therebetween. Light 22 introduced into the optical waveguide layer 20 through one end of the optical waveguide layer 20 in the X direction propagates through the inside of the optical waveguide layer 20 while being repeatedly reflected by the first mirror 30 provided on an upper surface (in FIG. 2, the upper side) of the optical waveguide layer 20 and the second mirror 40 provided on a lower surface (in FIG. 2, the lower side) of the optical waveguide layer 20. The light transmittance of the first mirror 30 is higher than the light transmittance of the second mirror 40. For this reason, a portion of the light can be outputted mainly from the first mirror 30.

In the case of a waveguide such as an ordinary optical fiber, light propagates along the waveguide while repeating total reflection. On the other hand, in the case of a waveguide element 10, light propagates while being repeatedly reflected by the mirrors 30 and 40 disposed above and below, respectively, the optical waveguide layer 20. For this reason, there are no restrictions on angles of propagation of light. The term "angle of propagation of light" here means an angle of incidence on the interface between the mirror 30 or 40 and the optical waveguide layer 20. Light falling on the mirror 30 or 40 at an angle that is closer to the perpendicular can be propagated, too. That is, light falling on the interface at an angle that is smaller than a critical angle of total reflection can be propagated, too. This causes the group speed of light in the direction of propagation of light to be much lower than the speed of light in free space. For this reason, the waveguide element 10 has such a property that conditions for propagation of light vary greatly according to changes in the wavelength of light, the thickness of the optical waveguide layer 20, and the refractive index of the optical waveguide layer 20. The waveguide element 10 is referred to as "reflective waveguide" or "slow light waveguide".

The angle of emission θ of light that is emitted into the air from the waveguide element 10 is expressed by Formula (1) as follows:

$$\sin\theta = \sqrt{n_w^2 - \left(\frac{m\lambda}{2d}\right)^2} \quad (1)$$

As can be seen from Formula (1), the direction of emission of light can be changed by changing any of the wavelength λ of light in the air, the refractive index $n_w$ of the optical waveguide layer 20, and the thickness d of the optical waveguide layer 20.

For example, in a case where $n_w$=2, d=387 nm, λ=1550 nm, and m=1, the angle of emission is 0 degree. Changing the refractive index from this state to $n_w$=2.2 changes the angle of emission to approximately 66 degrees. Meanwhile, changing the thickness to d=420 nm without changing the refractive index changes the angle of emission to approximately 51 degrees. Changing the wavelength to λ=1500 nm without changing the refractive index or the thickness changes the angle of emission to approximately 30 degrees. In this way, the direction of emission of light can be greatly changed by changing any of the wavelength λ of light, the refractive index $n_w$ of the optical waveguide layer 20, and the thickness d of the optical waveguide layer 20.

Accordingly, the optical scan device 100 of the present disclosure controls the direction of emission of light by controlling at least one of the wavelength λ of light that is inputted to each of the optical waveguide layers 20, the refractive index $n_w$ of each of the optical waveguide layers 20, or the thickness d of each of the optical waveguide layers 20. The wavelength λ of light may be kept constant without being changed during operation. In that case, an optical scan can be achieved through a simpler configuration. The wavelength λ is not limited to a particular wavelength. For example, the wavelength λ may be included in a wavelength range of 400 nm to 1100 nm (from visible light to near-infrared light) within which high detection sensitivity is attained by a common photodetector or image sensor that detects light by absorbing light through silicon (Si). In another example, the wavelength λ may be included in a near-infrared wavelength range of 1260 nm to 1625 nm within which an optical fiber or a Si waveguide has a comparatively small transmission loss. It should be noted that these wavelength ranges are merely examples. A wavelength range of light that is used is not limited to a wavelength range of visible light or infrared light but may for example be a wavelength range of ultraviolet light.

In order to change the direction of emitted light, the optical scan device 100 may include a first adjusting element that changes at least one of the refractive index of the optical waveguide layer 20 of each waveguide element 10, the thickness of the optical waveguide layer 20 of each waveguide element 10, or the wavelength.

As stated above, using a waveguide element 10 makes it possible to greatly change the direction of emission of light by changing at least one of the refractive index $n_w$ of the optical waveguide layer 20, the thickness d of the optical waveguide layer 20, or the wavelength λ. This makes it possible to change, to a direction along the waveguide element 10, the angle of emission of light that is emitted from the mirror 30. By using at least one waveguide element 10, such a one-dimensional scan can be achieved.

In order to adjust the refractive index of at least a part of the optical waveguide layer 20, the optical waveguide layer 20 may contain a liquid crystal material or an electro-optical material. The optical waveguide layer 20 may be sandwiched between a pair of electrodes. By applying a voltage to the pair of electrodes, the refractive index of the optical waveguide layer 20 can be changed.

In order to adjust the thickness of the optical waveguide layer 20, at least one actuator may be connected, for example, to at least either the first mirror 30 or the second mirror 40. The thickness of the optical waveguide layer 20 can be changed by varying the distance between the first mirror 30 and the second mirror 40 through the at least one actuator. When the optical waveguide layer 20 is formed from liquid, the thickness of the optical waveguide layer 20 may easily change.

Principle of Operation of Two-Dimensional Scan

In a waveguide array in which a plurality of waveguide elements 10 are unidirectionally arrayed, the interference of lights that are emitted from the respective waveguide elements 10 brings about a change in direction of emission of light. By adjusting the phases of lights that are supplied separately to each waveguide element 10, the direction of emission of light can be changed. The following describes the principles on which it is based.

Figure 3A:
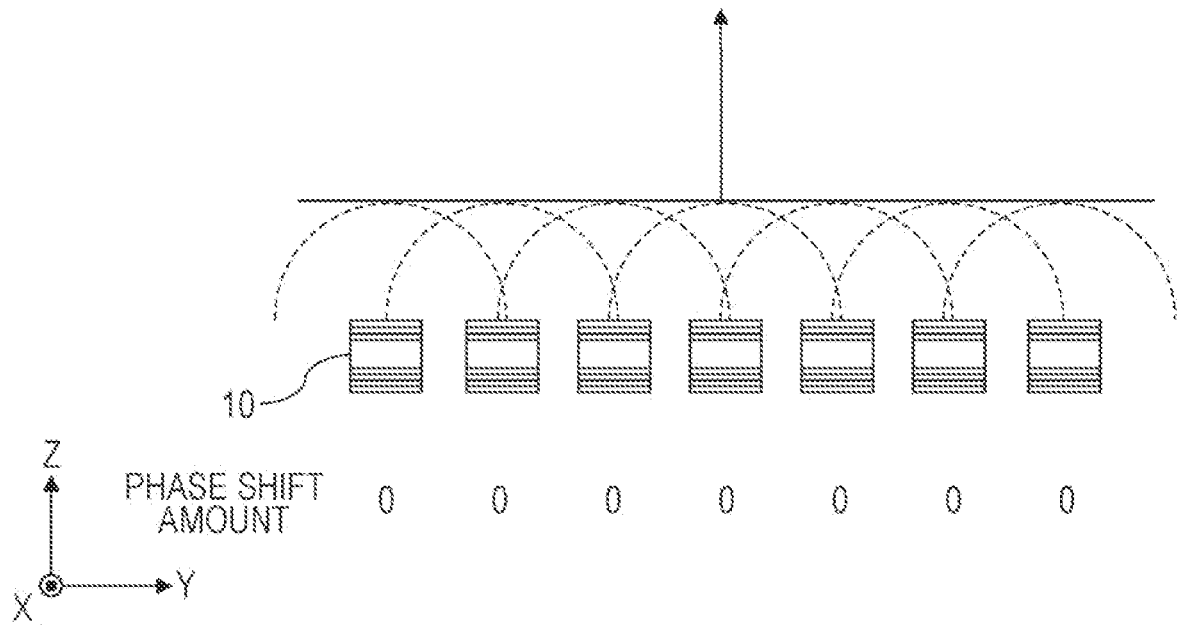
FIG. 3A is a diagram showing a cross-section of a waveguide array that emits light in a direction perpendicular to an exit face of the waveguide array.

FIG. 3A is a diagram showing a cross-section of a waveguide array that emits light in a direction perpendicular to an exit face of the waveguide array. FIG. 3A also describes the phase shift amounts of lights that propagate separately through each waveguide element 10. Note here that the phase shift amounts are values based on the phase of the light that propagates through the leftmost waveguide element 10. The waveguide array of the present disclosure includes a plurality of waveguide elements 10 arrayed at equal spacings. In FIG. 3A, the dashed circular arcs indicate the wave fronts of lights that are emitted separately from each waveguide element 10. The straight line indicates a wave front that is formed by the interference of the lights. The arrow indicates the direction of light that is emitted from the waveguide array (i.e. the direction of a wave number vector). In the example shown in FIG. 3A, lights propagating through the optical waveguide layers 20 of each separate waveguide element 10 are identical in phase to one another. In this case, the light is emitted in a direction (Z direction) perpendicular to both an array direction (Y direction) of the waveguide elements 10 and a direction (X direction) in which the optical waveguide layers 20 extend.

Figure 3B:
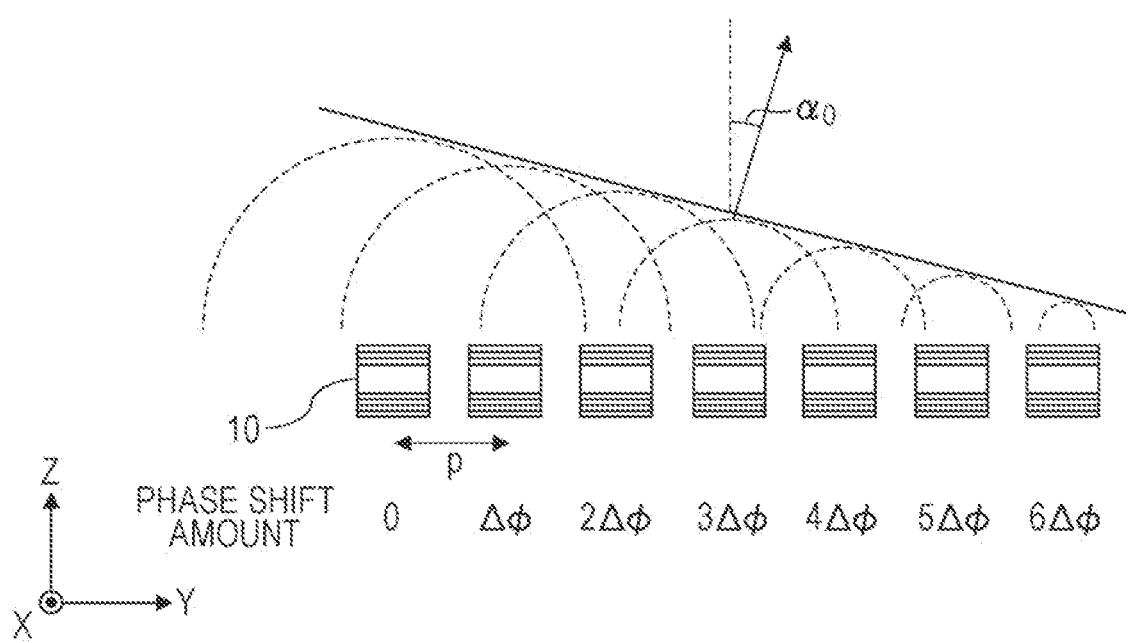
FIG. 3B is a diagram showing a cross-section of a waveguide array that emits light in a direction different from a direction perpendicular to an exit face of the waveguide array.

FIG. 3B is a diagram showing a cross-section of a waveguide array that emits light in a direction different from a direction perpendicular to an exit face of the waveguide array. In the example shown in FIG. 3B, lights propagating through the optical waveguide layers 20 of the plurality of waveguide elements 10 differ in phase from one another by a constant amount (ΔΟ in the array direction. In this case, the light is emitted in a direction different from the Z direction. By varying Δφ, a Y-direction component of the wave number vector of the light can be changed. Assuming that p is the center-to-center distance between two adjacent waveguide elements 10, the angle of emission $\alpha_0$ of light is expressed by Formula (2) as follows:

$$\sin\alpha_0 = \frac{\Delta\phi\lambda}{2\pi p} \quad (2)$$

In the example shown in FIG. 2, the direction of emission of light is parallel to the X-Z plane. That is, $\alpha_0=0°$. In each of the examples shown in FIGS. 3A and 3B, the direction of light that is emitted from the optical scan device 100 is parallel to a Y-Z plane. That is, θ=0°. However, in general, the direction of light that is emitted from the optical scan device 100 is not parallel to the X-Z plane or the Y-Z plane. That is, θ≠0° and $\alpha_0\ne0°$.

FIG. 4 is a perspective view schematically showing an example of a waveguide array in a three-dimensional space. The bold arrow shown in FIG. 4 represents the direction of light that is emitted from the optical scan device 100. θ is the angle formed by the direction of emission of light and the Y-Z plane. θ satisfies Formula (1). $\alpha_0$ is the angle formed by the direction of emission of light and the X-Z plane. $\alpha_0$ satisfies Formula (2).

Phase Control of Light that is Introduced into Waveguide Array

In order to control the phases of lights that are emitted from the respective waveguide elements 10, a phase shifter that changes the phase of light may be provided, for example, at a stage prior to the introduction of light into a waveguide element 10. The optical scan device 100 of the present disclosure includes a plurality of phase shifters connected separately to each of the plurality of waveguide elements 10 and a second adjusting element that adjusts the phases of lights that propagate separately through each phase shifter. Each phase shifter includes a waveguide joined either directly or via another waveguide to the optical waveguide layer 20 of a corresponding one of the plurality of waveguide elements 10. The second adjusting element varies differences in phase among lights propagating from the plurality of phase shifters to the plurality of waveguide elements 10 and thereby changes the direction (i.e. the third direction D3) of light that is emitted from the plurality of I waveguide elements 10. As is the case with the waveguide array, a plurality of arrayed phase shifters are hereinafter sometimes referred to as "phase shifter array".

Figure 5:
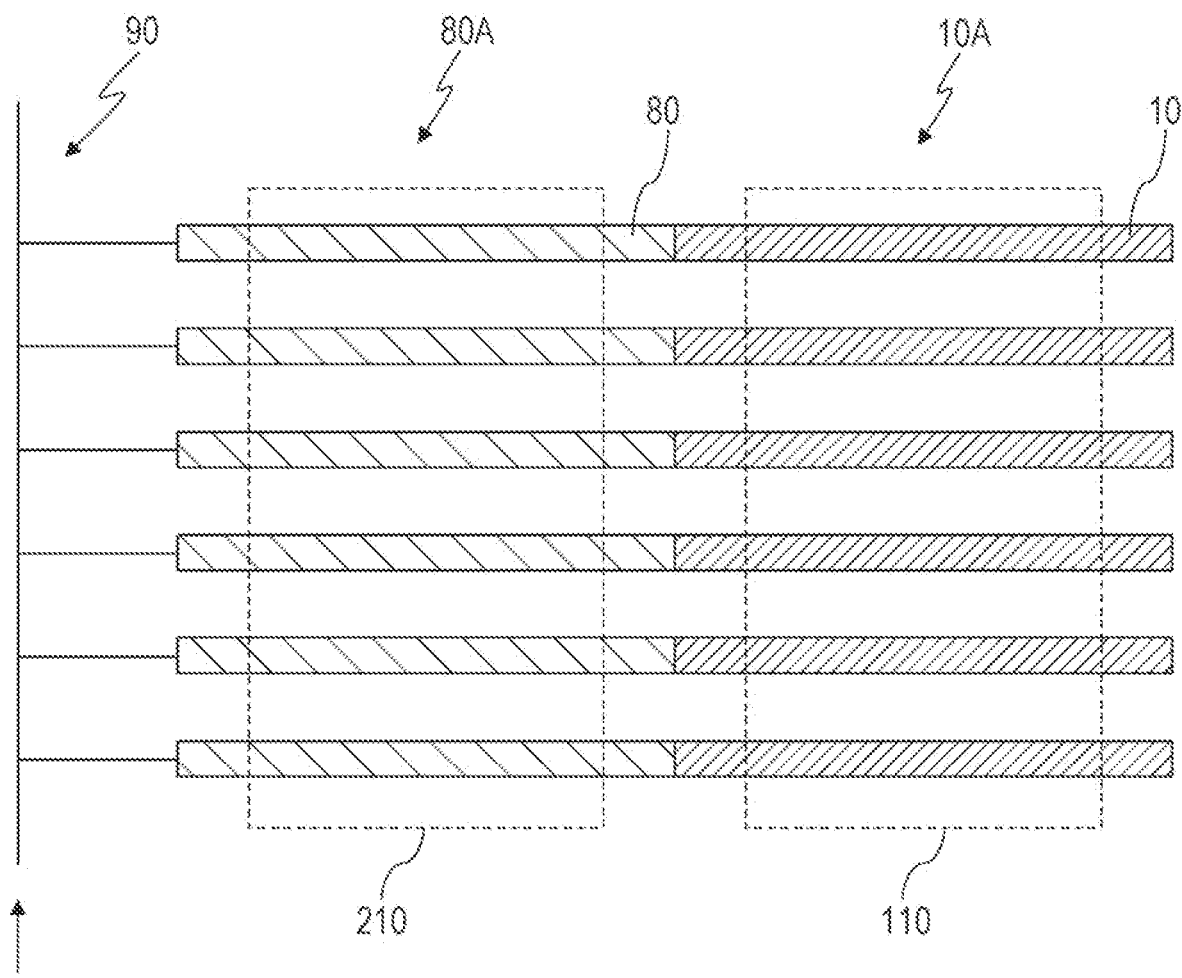
FIG. 5 is a schematic view of a waveguide array and a phase shifter array as seen from an angle parallel with a direction (Z direction) normal to a light exit face.

FIG. 5 is a schematic view of a waveguide array 10A and a phase shifter array 80A as seen from an angle parallel with a direction (Z direction) normal to a light exit face. In the example shown in FIG. 5, all phase shifters 80 have the same propagation characteristics, and all waveguide elements 10 have the same propagation characteristics. The phase shifter 80 and the waveguide elements 10 may be the same in length or may be different in length. In a case where the phase shifters 80 are equal in length, the respective phase shift amounts can be adjusted, for example, by a driving voltage. Further, by making a structure in which the lengths of the phase shifters 80 vary in equal steps, phase shifts can be given in equal steps by the same driving voltage. Furthermore, this optical scan device 100 further includes an optical divider 90 that divides light into lights and supplies the lights to the plurality of phase shifters 80, a first driving circuit 110 that drives each waveguide element 10, and a second driving circuit 210 that drives each phase shifter 80. The straight arrow shown in FIG. 5 indicates the inputting of light. A two-dimensional scan can be achieved by independently controlling the first driving circuit 110 and the second driving circuit 210, which are separately provided. In this example, the first driving circuit 110 functions as one element of the first adjusting element, and the second driving circuit 210 functions as one element of the second adjusting element.

The first driving circuit 110 changes at least either the refractive index or thickness of the optical waveguide layer 20 of each waveguide element 10 and thereby changes the angle of light that is emitted from the optical waveguide layer 20. The second driving circuit 210 changes the refractive index of the waveguide 20a of each phase shifter 80 and thereby changes the phase of light that propagates through the inside of the waveguide 20a. The optical divider 90 may be constituted by a waveguide through which light propagates by total reflection or may be constituted by a reflective waveguide that is similar to a waveguide element 10.

The lights divided by the optical divider 90 may be introduced into the phase shifters 80 after the phases of the lights have been controlled, respectively. This phase control may involve the use of, for example, a passive phase control structure based on an adjustment of the lengths of waveguides leading to the phase shifters 80. Alternatively, it is possible to use phase shifters that are similar in function to the phase shifters 80 and that can be controlled by electrical signals. The phases may be adjusted by such a method prior to introduction into the phase shifters 80, for example, so that lights of equal phases are supplied to all phase shifters 80. Such an adjustment makes it possible to simplify the control of each phase shifter 80 by the second driving circuit 210.

An optical device that is similar in configuration to the aforementioned optical scan device 100 can also be utilized as an optical receiver device. Details of the principle of operation of the optical device, a method of operation of the optical device, and the like are disclosed in U.S. Patent Application Publication No. 2018/0224709, the disclosure of which is hereby incorporated by reference herein in its entirety.

Connection Between Total Reflection Waveguide and Slow Light Waveguide

The following describes an example in which light is inputted from a total reflection waveguide to a slow light waveguide by connecting the total reflection waveguide and the slow light waveguide 10 to each other.

Figure 6:
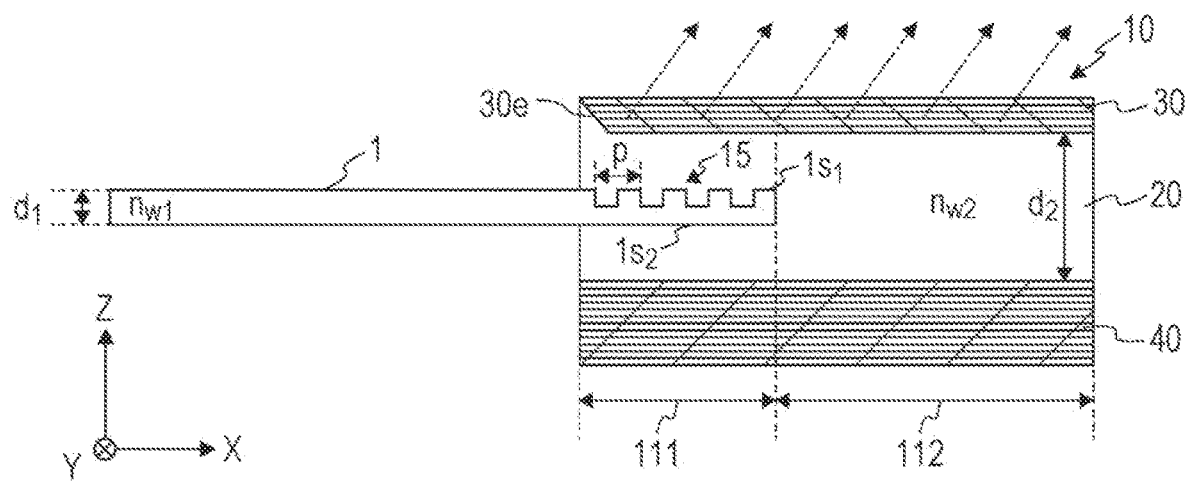
FIG. 6 is a diagram schematically showing an example of an optical device whose first mirror has an end deformed by processing.

FIG. 6 is a diagram schematically showing an example of an optical device in which a total reflection waveguide 1 and a slow light waveguide 10 are connected to each other. The total reflection waveguide 1 is herein referred to as "first waveguide 1", and the slow light waveguide 10 as "second waveguide 10". For now, the optical device shown in FIG. 6 is described without considering the shape of an end 30e of the first mirror 30.

At least a leading end of the total reflection waveguide 1 is structured to extend in the X direction. The slow light waveguide 10 is connected to the total reflection waveguide 1. The optical waveguide layer 20 of the slow light waveguide 10 contains a portion of the total reflection waveguide 1 including the leading end. The refractive index of the optical waveguide layer 20 is lower than the refractive index of the total reflection waveguide 1. When seen from an angle parallel with the Z direction, the total reflection waveguide 1 includes, in a connection region 111 in which the total reflection waveguide 1 and the slow light waveguide 10 overlap each other, a grating 15 whose refractive index changes with a period p along the X direction. The connection region 111 can be said to be a region in which the first mirror 30, the second mirror 40, and the total refection waveguide 1 overlap one another when seen from an angle parallel with the Z direction. The grating 15 shown in FIG. 6 has four depressions arranged in the X direction. In actuality, the grating 15 may be provided with a larger number of depressions. Instead of the depressions, projections may be provided. It is desirable that the number of depressions or projections that are arranged in the X direction in the grating 15 be for example larger than or equal to 4. Further, the number of depressions or projections may be larger than or equal to 4 and smaller than or equal to 64. In an example, the number of depressions or projections may be larger than or equal to 8 and smaller than or equal to 32. In an example, the number of depressions or projections may be larger than or equal to 8 and smaller than or equal to 16. The number of depressions or projections may be adjusted according to the diffraction efficiency of each depression or projection. The diffraction efficiency of each depression or projection depends on dimensional conditions such as the depth or height, width, and other dimensions of that depression or projection. Accordingly, the number of depressions or projections is adjusted according to the dimensions of each depressions or projections so that the grating 15 can attain satisfactory characteristics as a whole.

The total reflection waveguide 1 has, in the connection region 111, a first surface $1s_1$ facing the reflecting surface of the first mirror 30 and a second surface $1s_2$ facing the reflecting surface of the second mirror 40. In the example shown in FIG. 6, the grating 15 is provided in the first surface $1s_1$ of the total reflection waveguide 1. The grating 15 may be provided in the second surface $1s_2$. The grating 15 may be provided in at least either the first surface $1s_1$ or the second surface $1s_2$ of the total reflection waveguide 1.

The grating 15 may be provided in another place instead of being provided at the interface between the total reflection waveguide 1 and the slow light waveguide 10. Further, a plurality of gratings may be provided. In the connection region 111, in which the total reflection waveguide 1 and the slow light waveguide 10 overlap each other when seen from an angle parallel with a direction perpendicular to the reflecting surface of the first mirror 30, at least a part of the total reflection waveguide 1 and the slow light waveguide 10 may include at least one grating. Each grating undergoes a periodic change in refractive index along the X direction, in which the total reflection waveguide 1 and the slow light waveguide 10 extend.

A portion of the total reflection waveguide 1 located outside of the optical waveguide layer 20 may be supported by another dielectric layer or may be sandwiched between two dielectric layers.

The connection region 111 may have a length of, for example, approximately 3 μm to 50 μm. Inside of the connection region 111 of such a size, the grating 15 may be formed with a period of approximately 8 to 32. A non-connection region 112 may have a length of, for example, approximately 100 μm to 5 mm. The length of the connection region 111 may for example be approximately a several hundredths to a several tenths of the length of the non-connection region 112. Note, however, that the dimensions of each member are not limited to this length but determined according to required properties.

In the connection region 111, the first mirror 30 does not need to have a higher transmittance than the second mirror 40. In a part of the slow light waveguide 10 in the non-connection region 112 other than the connection region 111 that is close to the connection region 111, the first mirror 30 does not need to have a higher transmittance than the second mirror 40. The connection region 111 is provided for higher light coupling efficiency. For this reason, the slow light waveguide 10 does not need to necessarily emit light near the connection region 111.

Assume that a propagation constant of a waveguide mode in the total reflection waveguide 1 is given as $\beta_1 = 2\pi n_{e1}/\lambda$ and a propagation constant of a waveguide mode in the slow light waveguide 10 is given as $\beta_2 = 2\pi n_{e2}/\lambda$. $\lambda$ is the wavelength of light in air. $n_{e1}$ and $n_{e2}$ are the effective indices (also referred to as "equivalent refractive indices") of the total reflection waveguide 1 and the slow light waveguide 10. Light propagating through the inside of the total reflection waveguide 1 is not coupled to outside air. The effective index of such a waveguide mode is $n_{e1} > 1$. Meanwhile, a portion of light propagating through the optical waveguide layer 20 of the slow light waveguide 10 is emitted into the outside air. The effective index of such a waveguide mode is $0 < n_{e2} < 1$. Accordingly, $\beta_1$ and $\beta_2$ greatly differ from each other. Therefore, in general, the coupling efficiency of guided light from the total reflection waveguide 1 to the slow light waveguide 10 is low.

In the connection region 111, diffraction occurs due to the grating 15 in a case where the total reflection waveguide 1 includes the grating 15. In that case, the propagation constant 131 of the waveguide mode in the total reflection waveguide 1 shifts by an integral multiple of a reciprocal lattice $2\pi/p$. For example, in a case where β1 shifts to $\beta_1 - (2\pi/p)$ due to negative first order diffraction, setting p as appropriate allows $\beta_1 - (2\pi/p) = \beta_2$ to hold. In that case, the two propagation constants in the connection region 111 are the same, so that the guided light is coupled from the total reflection waveguide 1 to the slow light waveguide 10 with high efficiency. From $\beta_1 - (2\pi/p) = \beta_2$, the period p is expressed by Formula (3) as follows:

$$p = \frac{\lambda}{n_{e1} - n_{e2}} \quad (3)$$

Since $0 < n_{e2} < 1$, the period p satisfies Formula (4) as follows:

$$\frac{\lambda}{n_{e1}} < p = \frac{\lambda}{n_{e1} - n_{e2}} < \frac{\lambda}{n_{e1} - 1} \quad (4)$$

In the slow light waveguide 10, the guided light is coupled with high efficiency, as the connection region 111 and the non-connection region 112 other than the connection region 111 are identical in waveguide mode.

In the aforementioned example, a grating is provided all over the connection region 111, in which the first waveguide 1 and the second waveguide 10 overlap each other. However, the structure of an optical device of the present disclosure is not limited to such a structure. The grating may be provided only in a part of the connection region 111, e.g. a site of the connection region 111 that is close to a leading end of the first waveguide 1. In other words, no grating needs to be provided in a site of the connection region 111 that is far away from the leading end of the first waveguide 1. In an embodiment of the present disclosure, one or more gratings are provided in a place located at a distance that is longer than at least either the thickness of the first mirror 30 or the thickness of the second mirror 40 in the first direction from the interface between a medium (e.g. air) touching both the optical waveguide layer 20 and the first waveguide 1 and the optical waveguide layer 20. Studies by the inventors have made it clear that such a structure makes it easy to achieve satisfactory light emission characteristics even in a case where the thickness of the optical waveguide layer 20 is not uniform.

In the aforementioned example, it was assumed that the thickness of the optical waveguide layer 20 is constant along the X direction. However, in actuality, the thickness of the optical waveguide layer 20 changes along the X direction for various reasons. The following describes in detail an influence exerted by a change in thickness of the optical waveguide layer 20 along the X direction. Although the number of gratings is 1 in the following description, the number of gratings may be larger than or equal to 2.

Figure 7:
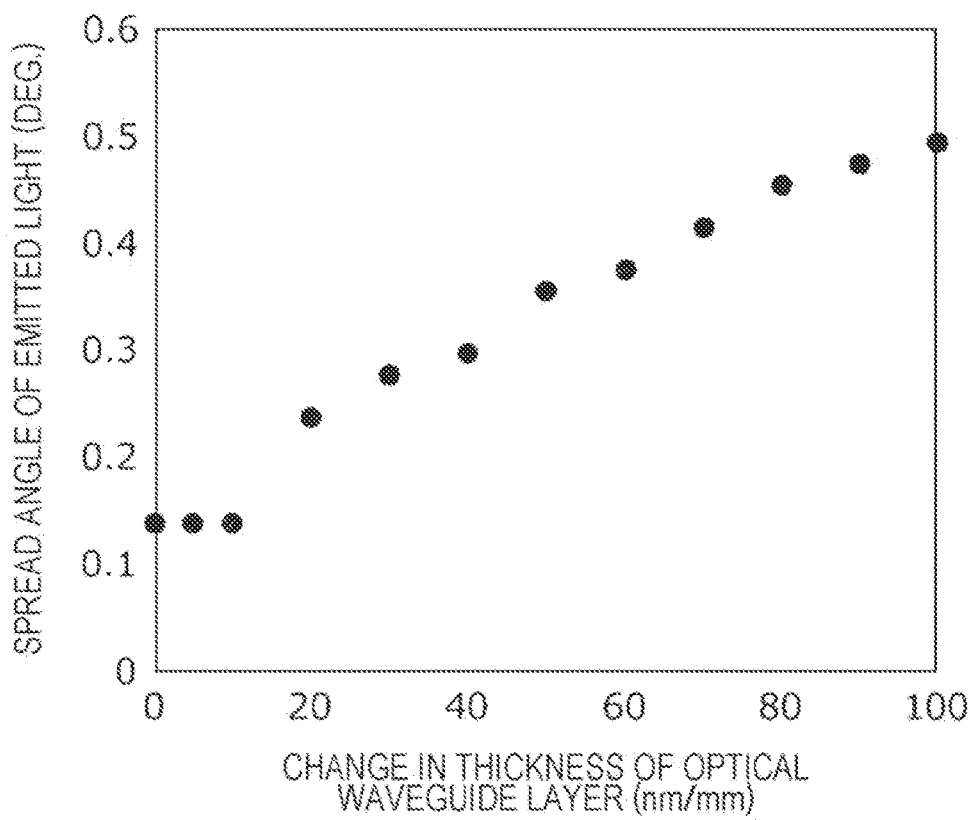
FIG. 7 is a diagram showing a relationship between a change in thickness of an optical waveguide layer and a spread angle of emitted light from the first mirror.

FIG. 7 is a diagram showing an example of a result of calculation of a relationship between a rate of change in thickness of the optical waveguide layer 20 and a spread angle of emitted light from the first mirror 30. The rate of change in thickness of the optical waveguide layer 20 in the example of FIG. 7 ranges from 0 nm/mm to 100 nm/mm. The term "rate of change in thickness" here means an amount of change in thickness with respect to a displacement of 1 mm along the direction of the length of the optical waveguide layer 20, i.e. the first direction. The rate of change in thickness "0 nm/mm" indicates that the thickness of the optical waveguide layer 20 does not substantially change along the X direction. The rate of change in thickness "100 nm/mm" indicates that the thickness of the optical waveguide layer 20 changes by 100 nm with respect to a displacement of 1 mm along the direction of the length of the optical waveguide layer 20.

The present calculation assumed a waveguide in which the thickness of the optical waveguide layer 20 changes along the X direction, with the thickness of the optical waveguide layer 20 being 2.15 μm and the refractive index being 1.68. A complex amplitude of light that is emitted from an exit surface of the first mirror 30 was calculated, and by performing two-dimensional discrete Fourier transformation on the complex amplitude, an angle spectrum of the emitted light at a great distance was calculated. In the following description, the spread angle of the emitted light is described as a full width at half maximum of the emitted light in the angle spectrum.

As shown in FIG. 7, in a case where the rate of change in thickness of the optical waveguide layer 20 is approximately 10 nm/mm, the spread angle of the emitted light is substantially the same as it is in a case where the thickness of the optical waveguide layer 20 is constant. However, in a case where the rate of change in thickness of the optical waveguide layer 20 is higher than or equal to 20 nm/mm, the spread angle of the emitted light substantially monotonically increases with respect to the inclination of the optical waveguide layer 20. Such a spread of the emitted light is attributed to the fact that nonuniformity in the thickness of the optical waveguide layer 20 causes disturbances in phase distribution of light emitted from the first mirror 30. When the spread angle of the emitted light is large, the emitted light loses its straightness. In particular, in the connection region 111, in which the total reflection waveguide 1 and the slow light waveguide 10 are connected to each other, the intensity of light emitted from the first mirror 30 is higher than in a site that is further forward than the connection region 111 in the direction that the light is traveling. Accordingly, if the thickness of a part of the optical waveguide layer 20 that is in the connection region 111 is not constant, there is a possibility that a comparatively intense emitted light may excessively spread in a case where light has been emitted from a part of the first mirror 30 that is in the connection region 111.

A possible reason for the change in thickness of the optical waveguide layer 20 is a change in shape of an end of the first mirror 30 by processing. As shown in FIG. 6, the end 30e of the first mirror 30 may be inclined, for example, by etching. Furthermore, another possible reason for the change in thickness of the optical waveguide layer 20 is warpage of the first mirror 30 and/or the second mirror 40.

The following describes an example of an optical device that reduces an influence exerted by a change in thickness of the optical waveguide layer 20.

Figure 8A:
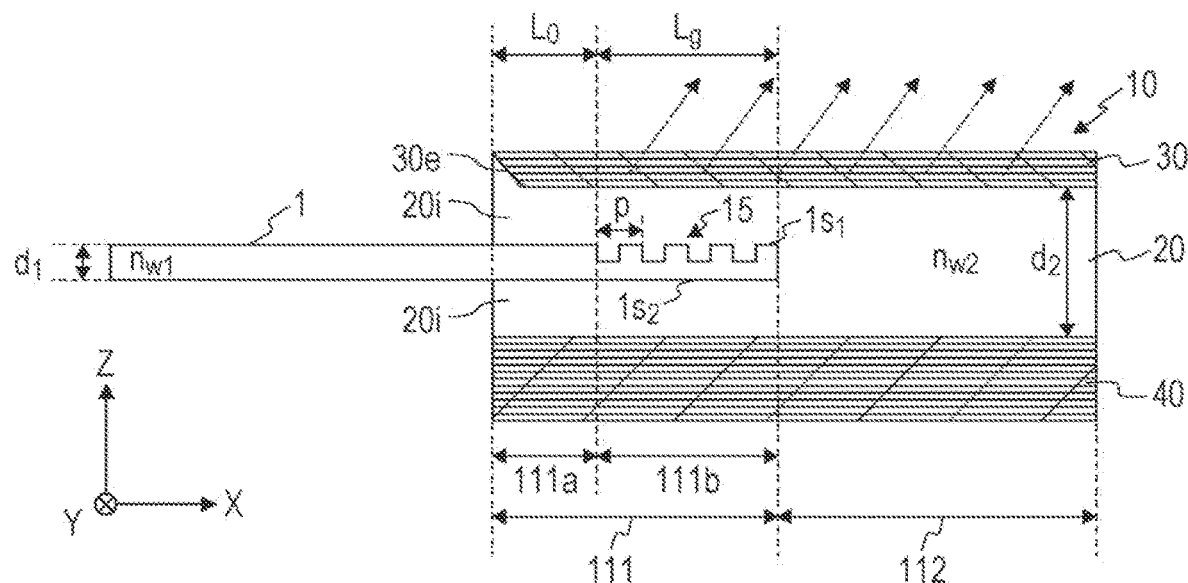
FIG. 8A is a diagram schematically showing an optical device according to an exemplary embodiment of the present disclosure.

FIG. 8A is a diagram schematically showing an optical device according to an exemplary embodiment of the present disclosure. A medium around the optical device is for example air. The total reflection waveguide 1 is surrounded by an interface 20i between a medium touching both the optical waveguide layer 20 and the total reflection waveguide 1 and the optical waveguide layer 20. In the present embodiment, ends of the first and second mirrors 30 and 40 in the X direction coincide with each other. Therefore, an end face 20i of the connection region 111 in the present embodiment is a surface passing through the ends of the first and second mirrors 30 and 40 and parallel to the Y direction and the Z direction. The end face 20i is an end of the connection region 111 in the present embodiment. Further, in the present embodiment, the interface 20i between the medium and the optical waveguide layer 20 coincides with the end face 20i of the connection region 111. As shown in FIG. 8A, the grating 15 is located further inside of the optical waveguide layer 20 at a longer distance from the end 30e of the first mirror 30 than in the example shown in FIG. 6. In a case where the length of an X-direction projection of an incline of the end 30e of the first mirror 30 exceeds the thickness of the first mirror 30, such a first mirror 30 cannot be used in an optical device from the viewpoint of reliability. For this reason, in a first mirror 30 that is actually used in an optical device, the length of an X-direction projection of the incline of the end 30e is less than or equal to the thickness of the first mirror 30. The thickness of the first mirror 30 may for example be 3 µm. The same applies in a case where the second mirror 40 has, near the end face 20i, an end face such as that of the first mirror 30. Accordingly, in order to reduce an influence exerted by a change in thickness of the optical waveguide layer 20, the grating 15 may be disposed at a distance that is longer than at least either the thickness of the first mirror 30 or the thickness of the second mirror 40 in the X direction from the end face 20i. In other words, the distance $L_0$ from the end face 20i to the grating 15 in the X direction is longer than at least either the thickness of the first mirror 30 or the thickness of the second mirror 40. The "distance $L_0$ from the end face 20i to the grating 15" here means the distance between one of two ends of the grating 15 that is closer to the end face 20i and the end face 20i.

Figure 8B:
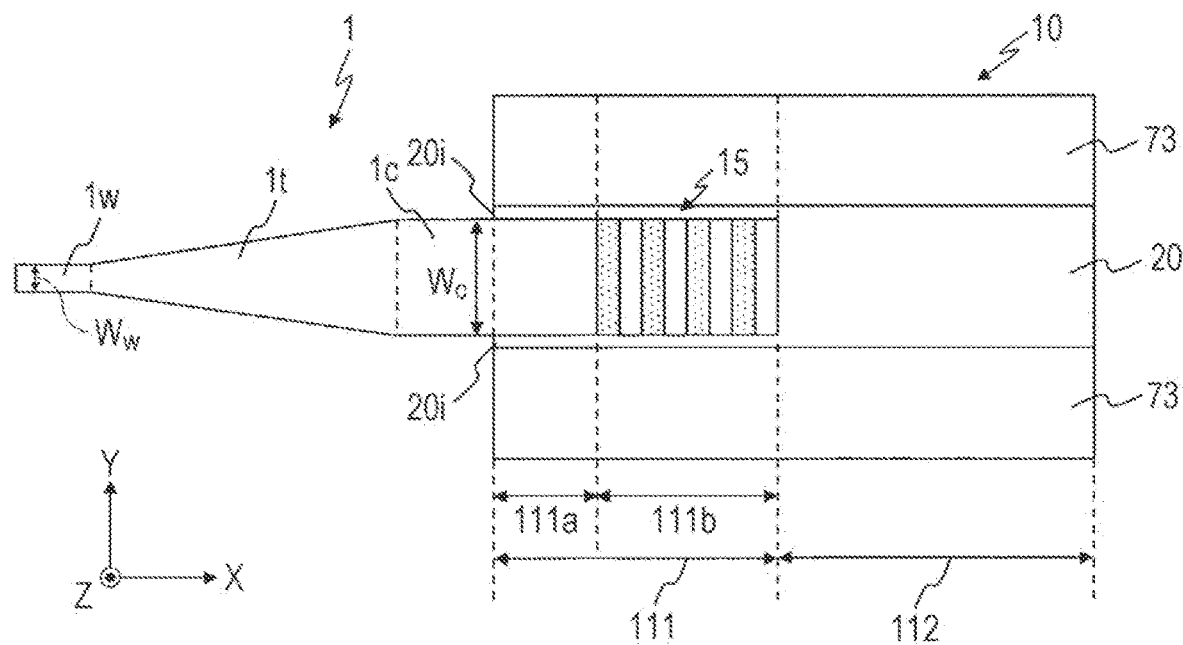
FIG. 8B is a schematic view of a connection between a total reflection waveguide and a slow light waveguide shown in FIG. 8A as seen from an angle parallel with the Z direction.

FIG. 8B is a schematic view of a connection between a total reflection waveguide 1 and a slow light waveguide 10 shown in FIG. 8A as seen from an angle parallel with the Z direction. In the example shown in FIG. 8B, the total reflection waveguide 1 includes a portion of the total reflection waveguide 1 that is outside of the optical waveguide layer 20 and whose width monotonically increases toward the slow light waveguide 10. That is, a part of the total reflection waveguide 1 has a tapered structure 1t. The width $w_w$ of a portion of the total reflection waveguide 1 that is far away from the optical waveguide layer 20 is narrower than the width we of a portion of the total reflection waveguide 1 that is in the connection region 111, which is a coupler. The width $w_w$ may for example be approximately 1/100 to 1/2 of the width we. The tapered structure 1t is present between a narrow waveguide portion 1w and a wide waveguide portion 1c of the total reflection waveguide 1. Employing such a structure makes it possible to inhibit light propagating through the narrow waveguide portion 1w from being reflected when falling on the wide waveguide portion 1c.

Incidentally, the warpage of the first mirror 30 and/or the second mirror 40 reaches its minimum near the center(s) of the first mirror 30 and/or the second mirror 40 in the X direction. For this reason, the grating 15 may be located in an inner part of the optical waveguide layer 20 that is near the center(s) of the first mirror 30 and/or the second mirror 40 in the X direction. Meanwhile, when the distance $L_0$ from the end face 20i to the grating 15 is shorter, there is a lower probability of a defect and/or a particle in a portion of the total reflection waveguide 1 located inside of the optical waveguide layer 20. Accordingly, the sum $L_0+L_g$ of the distance $L_0$ from the end face 20i to the grating 15 and the length $L_g$ of the grating 15 may be shorter than a shorter one of a half of the length of the first mirror 30 and a half of the length of the second mirror 40. $L_0+L_g$ corresponds to the length of the connection region 111 shown in FIG. 8A. The whole length of each of the first and second mirrors 30 and 40 shown in FIG. 8A is not limited to any particular value, but may for example be greater than or equal to 300 µm and less than or equal to 10 mm. In an example, the length may be greater than or equal to 1 mm and less than or equal to 5 mm, e.g. approximately 2 mm.

The connection region 111 can be divided into a first connection region 111a including no grating and a second connection region 111b including the grating 15. The length of the first connection region 111a is $L_0$, and the length of the second connection region 111b is $L_g$. The length $L_0$ of the first connection region 111a may for example be greater than or equal to 3 µm and less than or equal to 1 mm. The length $L_0$ may be greater than or equal to 10 µm and less than or equal to 1 mm. In another example, the length $L_0$ may be set to be greater than or equal to 150 µm and less than or equal to 1 mm.

The following describes an example of an optical device in which the distance $L_0$ from the end face 20i to the grating 15 is longer.

Figure 9:
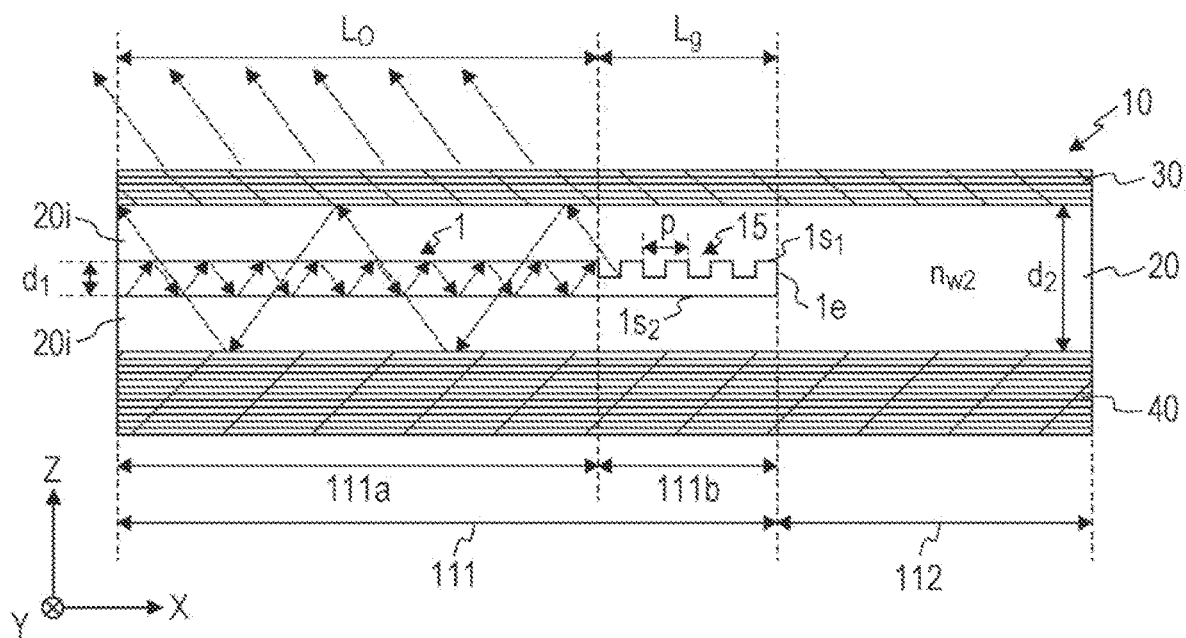
FIG. 9 is a diagram schematically showing an example of an optical device in which the distance from an interface to a grating is longer.

FIG. 9 is a diagram schematically showing an example of an optical device in which the distance $L_0$ from the end face 20i to the grating 15 is longer. The distance $L_0$ from the end face 20i to the grating 15 may for example be set to a value that is longer than an attenuation distance required for the intensity of light propagating along the X direction through the slow light waveguide 10 to be attenuated to 1/e, where e is the base of a natural logarithm. The attenuation distance may for example range from approximately 150 µm to approximately 200 µm or be longer than that. The attenuation distance may be a several tenths of the length of a region in which the first mirror 30 and the second mirror 40 overlap each other when seen from an angle parallel with the Z direction. When Formula (3) is not satisfied, light propagating through the total reflection waveguide 1 does not propagate through the non-connection region 112 but is reflected by an end face 1e of the total reflection waveguide 1 situated in the optical waveguide layer 20. A portion of the light thus reflected leaks into the part of the optical waveguide layer 20 that is in the connection region 111, and propagates in a −X direction. This allows light propagating in the −X direction through the inside of the optical waveguide layer 20 to be emitted backward from the part of the first mirror 30 that is in the connection region 111. Furthermore, in a case where the optical waveguide layer 20 contains a liquid crystal material or an electro-optical material, adjusting the refractive index of the optical waveguide layer 20 so as to satisfy Formula (3) makes it possible to switch the direction of emission of light from backward to forward and vice versa. The term "forward" means that the direction of emission of light emitted from the slow light waveguide 10 has a +X direction component from the total reflection waveguide 1 toward the slow light waveguide 10. The term "backward" means that the direction of emission of light emitted from the slow light waveguide 10 has a −X direction component from the slow light waveguide 10 toward the total reflection waveguide 1. The following describes modifications of the connection between the total reflection waveguide 1 and the slow light waveguide 10 through the grating 15. The following modifications, which are described with reference to FIGS. 10A to 10C and FIGS. 11A and 11B, have it common with the example shown in FIG. 8A in that the grating 15 is located further inside of the optical waveguide layer 20.

Figure 10A:
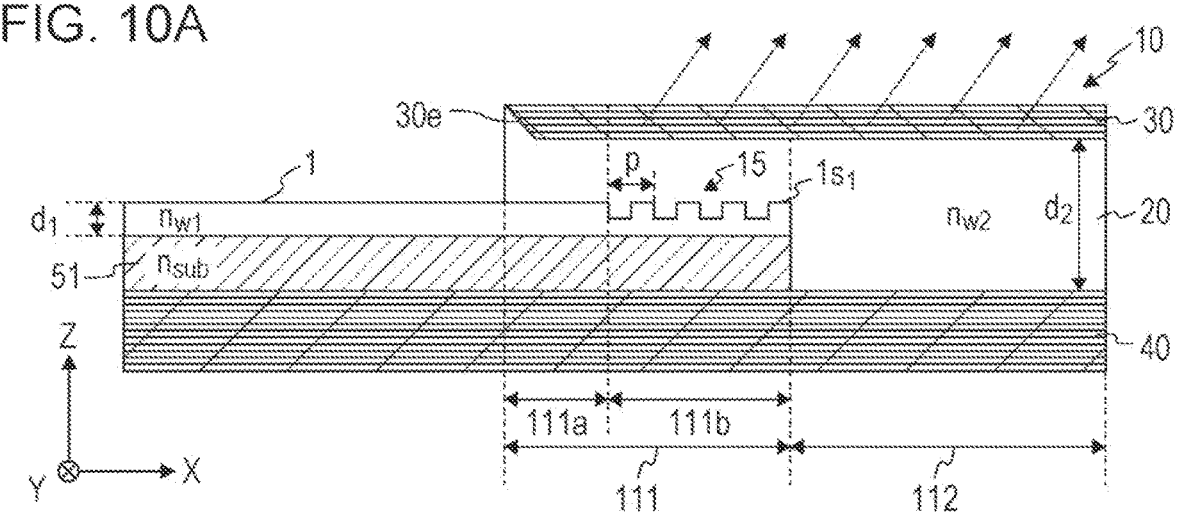
FIG. 10A is a diagram schematically showing a first modification of the optical device shown in FIG. 8A.
Figure 10B:
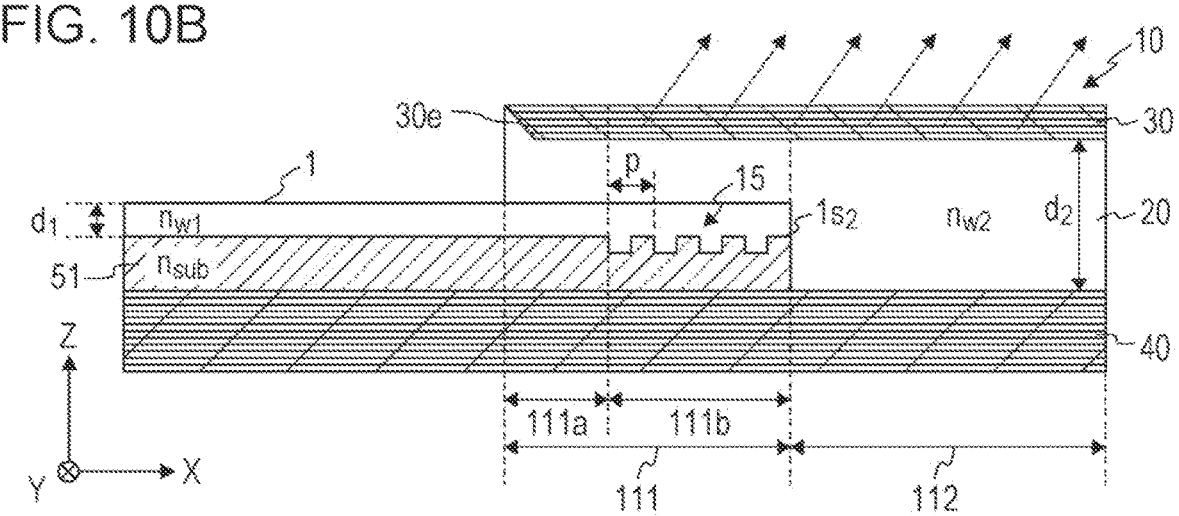
FIG. 10B is a diagram schematically showing a second modification of the optical device shown in FIG. 8A.
Figure 10C:
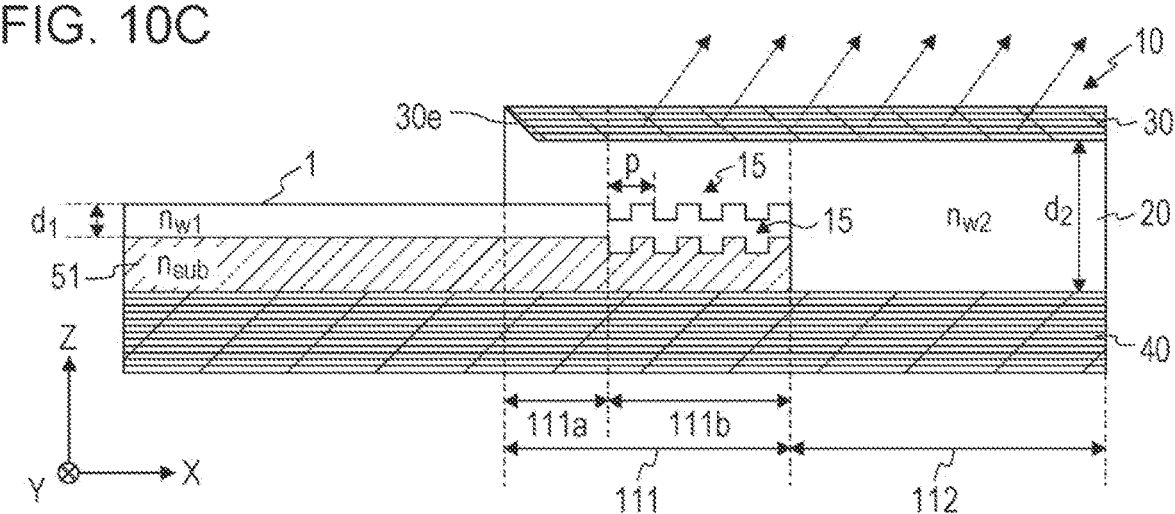
FIG. 10C is a diagram schematically showing a third modification of the optical device shown in FIG. 8A.

FIGS. 10A to 10C are cross-sectional views schematically showing modifications of the optical device shown in FIG. 8A. In each of the examples shown in FIGS. 10A to 10C, the total reflection waveguide 1 is supported by a dielectric layer 51, and the dielectric layer 51 is supported by the second mirror 40. The total reflection waveguide 1 and the slow light waveguide 10 shares the second mirror 40 in common. The dielectric layer 51 is formed, for example, from $SiO_2$. The refractive index $n_{sub}$ of the dielectric layer 51 is lower than the refractive index $n_{w1}$ of the total reflection waveguide 1. Accordingly, light propagating through the total reflection waveguide 1 does not leak into the dielectric layer 51. The dielectric layer 51 does not need to be supported by the second mirror 40. In a region other than the connection region 111 and the non-connection region 112, the second mirror 40 may be replaced by a structure made of the same material as the dielectric layer 51. An end face of the connection region 111 in the present modification is a surface passing through the end of the first and second mirror 30 and parallel to the Y direction and the Z direction. The end face is an end face of the connection region 111 in the present embodiment.

In the example shown in FIG. 10A, the total reflection waveguide 1 has a grating 15 provided in the first surface $1s_1$. In the example shown in FIG. 10B, the total reflection waveguide 1 has a grating 15 provided in the second surface $1s_2$. In the example shown in FIG. 10C, the total reflection waveguide 1 has gratings 15 provided in both the first surface $1s_1$ and the second surface $1s_2$.

Thus, the total reflection waveguide 1 may have a grating 15 provided in at least either the first surface $1s_1$ or the second surface $1s_2$.

Figure 11A:
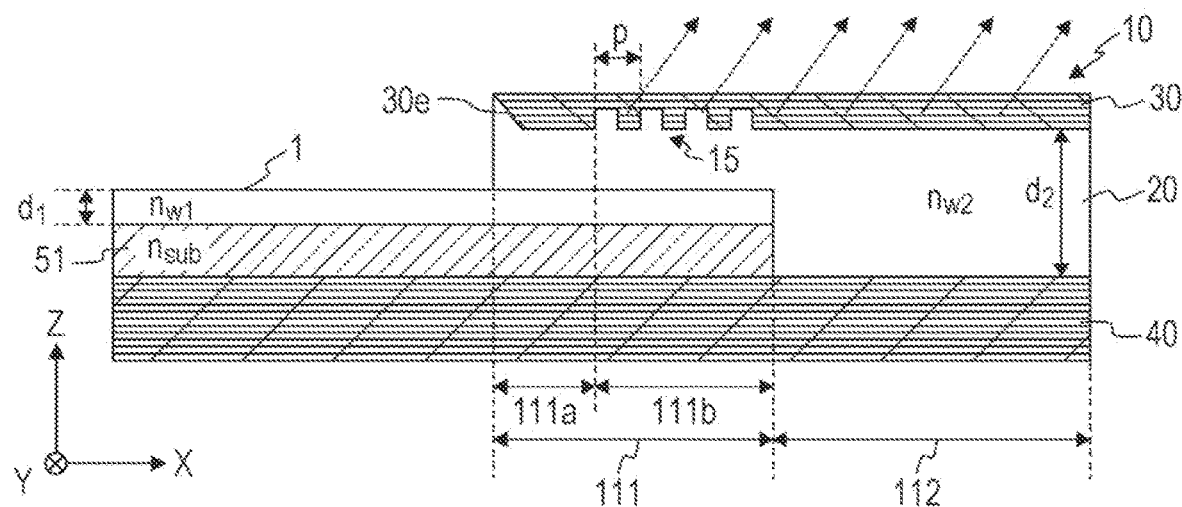
FIG. 11A is a diagram schematically showing a fourth modification of the optical device shown in FIG. 8A.
Figure 11B:
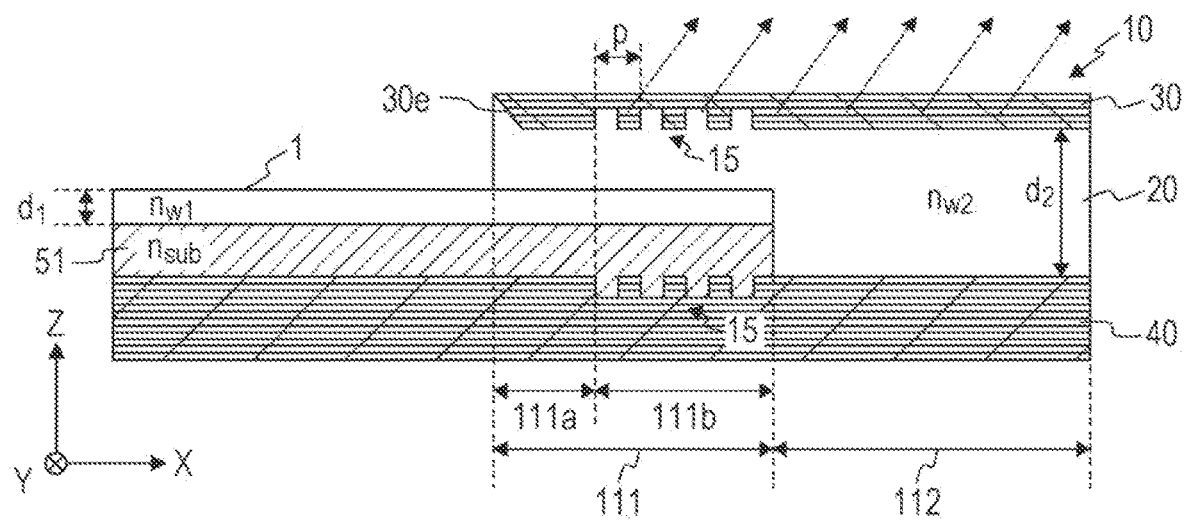
FIG. 11B is a diagram schematically showing a fifth modification of the optical device shown in FIG. 8A.

FIGS. 11A and 11B are cross-sectional views schematically showing other modifications of the optical device shown in FIG. 8A. In each of the examples shown in FIGS. 11A and 11B, as in the case of each of the examples shown in FIGS. 10A to 10C, the total reflection waveguide 1 is supported by a dielectric layer 51, and the dielectric layer 51 is supported by the second mirror 40.

In each of the examples shown in FIGS. 11A and 11B, a grating(s) 15 is/are formed not in the total reflection waveguide 1 but in the reflecting surface(s) of the first mirror 30 and/or the second mirror 40. In the example shown in FIG. 11A, the slow light waveguide 10 has a grating 15 provided in the reflecting surface of the first mirror 30. In the example shown in FIG. 11B, the slow light waveguide 10 has a grating 15 provided in the reflecting surface of the second mirror 40.

In each of the examples shown in FIGS. 11A and 11B, the distance between the total reflection waveguide 1 and the first mirror 30 and/or the second mirror 40 in the Z direction is comparatively short. This causes evanescent light in the total reflection waveguide 1 to be diffracted by the grating 15. As a result, as in the case of the aforementioned example, the coupling efficiency of guided light from the total reflection waveguide 1 to the slow light waveguide 10 can be enhanced. Thus, the slow light waveguide 10 may have a grating 15 provided in at least either the reflecting surface of the first mirror 30 or the reflecting surface of the second mirror 40.

As shown in FIG. 8A, FIGS. 10A to 10C, and FIGS. 11A and 11B, at least either the total reflection waveguide 1 or the slow light waveguide 10 has a grating 15 in a part of a portion in which the total reflection waveguide 1 and the slow light waveguide 10 overlap each other when seen from an angle parallel with the Z direction.

As shown in FIGS. 10A to 10C and FIGS. 11A and 11B, the total reflection waveguide 1 shown in FIG. 9 may be supported by a dielectric layer 51 on the second mirror 40, too.

The following describes functions that the constituent elements of the aforementioned optical device may have.

At least a part of the optical waveguide layer 20 may have a structure whose refractive index and/or thickness can be adjusted. Adjusting the refractive index and/or the thickness brings about a change in an X-direction component of the direction of light emitted from the first mirror 30.

In order to adjust the refractive index of at least a part of the optical waveguide layer 20, the optical waveguide layer 20 may contain a liquid crystal material or an electro-optical material. The optical waveguide layer 20 may be sandwiched between a pair of electrodes. Application of a voltage to the pair of electrodes makes it possible to change the refractive index of the optical waveguide layer 20.

The refractive index of the part of the optical waveguide layer 20 that is in the connection region 111 and the refractive index of a part of the optical waveguide layer 20 that is in the non-connection region 112 may be adjusted simultaneously. However, adjusting the refractive index in the connection region 111 may bring about a change in the condition of Formula (3). This may result in a decrease in the coupling efficiency of guided light from the total reflection waveguide 1 to the slow light waveguide 10. This problem may be addressed by making it possible to adjust only the refractive index in the non-connection region 112 while keeping the refraction index in the connection region 111 constant. Even if there is a difference in refractive index between the connection region 111 and the non-connection region 112, the influence of reflection of guided light at the interface between the connection region 111 and the non-connection region 112 is limited.

In that case, the pair of electrodes (also referred to as "first pair of electrodes") face each other across a portion of the optical waveguide layer 20 different from a portion of the optical waveguide layer 20 overlapping the total reflection waveguide 1 when seen from an angle parallel with a direction perpendicular to the reflecting surface of the first mirror 30. Application of a voltage to the pair of electrodes by a control circuit (not illustrated) makes it possible to adjust the refractive index of at least the part in the non-connection region 112.

Ideally, the condition of Formula (3) should be satisfied as designed; however, in actuality, due to a manufacturing error, the condition of Formula (3) may not be satisfied. As a compensation for such a case, the optical device may be given the function of adjusting the refractive index in the connection region 111 separately from the function of adjusting the refractive index in the non-connection region 112.

In that case, a second pair of electrodes may be provided in addition to the first pair of electrodes. The second pair of electrodes face each other across at least a part of a portion of the optical waveguide layer 20 overlapping the total reflection waveguide 1 when seen from an angle parallel with the Z direction. By independently applying voltages to the first pair of electrodes and the second pair of electrodes, the control circuit can independently adjust the refractive index of a portion of the optical waveguide layer 20 located between the first pair of electrodes and the refractive index of a portion of the optical waveguide layer 20 located between the second pair of electrodes.

In order to adjust the thickness of the optical waveguide layer 20, at least one actuator may be connected, for example, to at least either the first mirror 30 or the second mirror 40. The control circuit can change the thickness of the optical waveguide layer 20 by varying the distance between the first mirror 30 and the second mirror 40 by controlling the at least one actuator. When the optical waveguide layer 20 is formed from liquid, the thickness of the optical waveguide layer 20 may easily change.

The at least one actuator may be connected to a part of at least either the first mirror 30 or the second mirror 40 that is in the non-connection region 112. The actuator makes it possible to change the thickness of the part of the optical waveguide layer 20 that is in the non-connection region 112. This brings about no change in the condition of Formula (3).

The at least one actuator may include two actuators. One of the actuators may be connected to a part of at least either the first mirror 30 or the second mirror 40 that is in the connection region 111. The other of the actuators may be connected to the part of at least either the first mirror 30 or the second mirror 40 that is in the non-connection region 112. The two actuators make it possible to separately change the thickness of the part of the optical waveguide layer 20 that is in the connection region 111 and the thickness of the part of the optical waveguide layer 20 that is in the non-connection region 112. This makes it possible to compensate for a case where the condition of Formula (3) is not satisfied as designed.

A two-dimensional optical scan is enabled by configuring an optical device to include a plurality of combinations of a total reflection waveguide 1 and a slow light waveguide 10. Such an optical scan device includes a plurality of waveguide units arranged in the Y direction. Each waveguide unit includes the total reflection waveguide 1 and the slow light waveguide 10. In the optical scan device, a plurality of phase shifters are connected separately to each of the plurality of waveguide units. Each of the plurality of phase shifters includes a waveguide joined either directly or via another waveguide to the total reflection waveguide of a corresponding one of the plurality of waveguide units. By varying differences in phase among lights passing through the plurality of phase shifters, a Y-direction component of the direction of light that is emitted from the optical scan device can be changed. An optical receiver device can be configured by a similar structure.

Examples of Application

Figure 12:
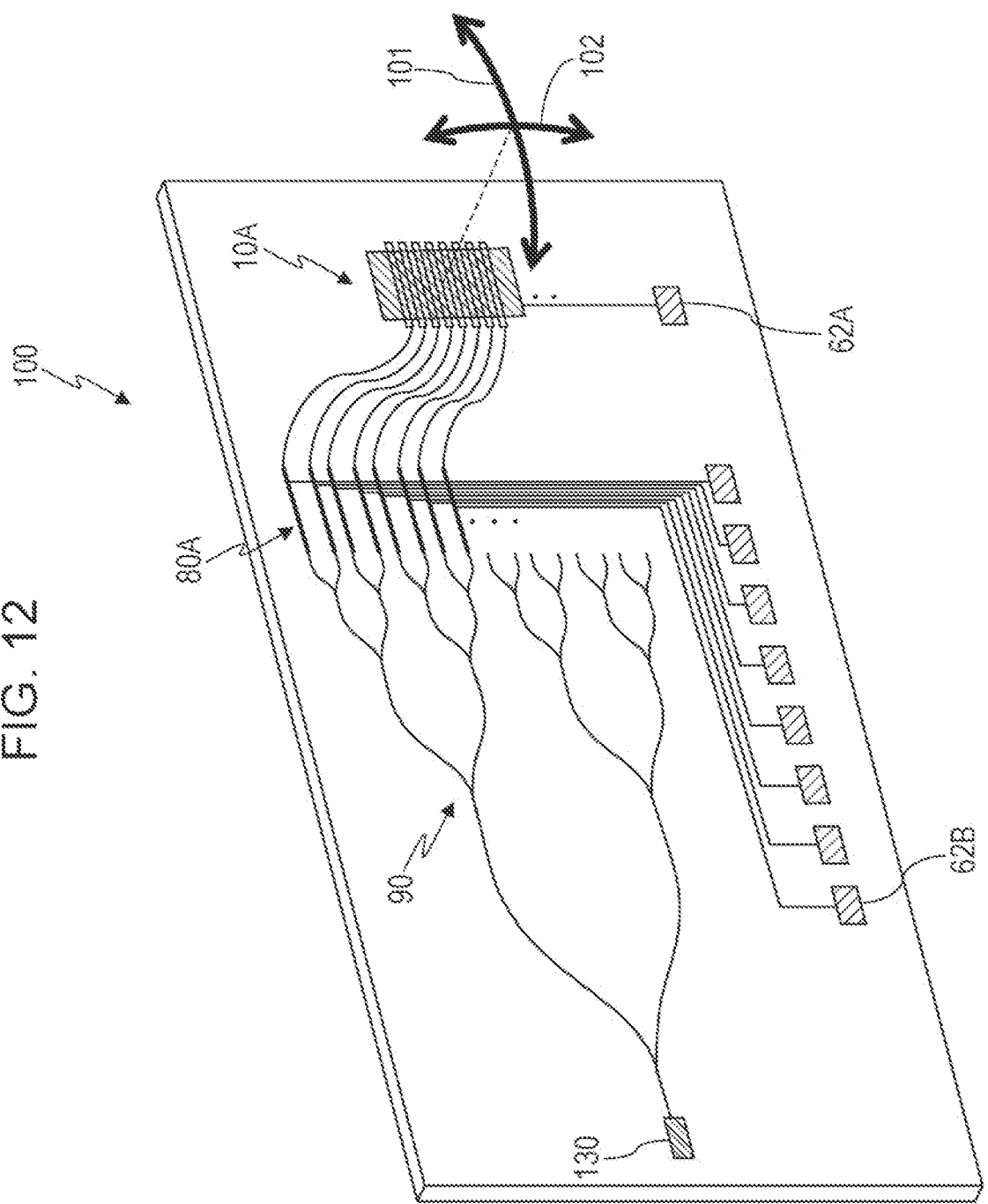
FIG. 12 is a diagram showing an example configuration of an optical scan device in which elements such as an optical divider, a waveguide array, a phase shifter array, and a light source are integrated on a circuit board.

FIG. 12 is a diagram showing an example configuration of an optical scan device 100 in which elements such as an optical divider 90, a waveguide array 10A, a phase shifter array 80A, and a light source 130 are integrated on a circuit board (e.g. a chip). The light source 130 may for example be a light-emitting element such as a semiconductor laser. In this example, the light source 130 emits single-wavelength light whose wavelength in free space is $\lambda$. The optical divider 90 divides the light from the light source 130 into lights and introduces the lights into waveguides of the plurality of phase shifters 80. In the example shown in FIG. 12, there are provided an electrode 62A and a plurality of electrodes 62B on the chip. The waveguide array 10A is supplied with a control signal from the electrode 62A. To the plurality of phase shifters 80 in the phase shifter array 80A, control signals are sent from the plurality of electrodes 62B, respectively. The electrode 62A and the plurality of electrodes 62B may be connected to a control circuit (not illustrated) that generates the control signals. The control circuit may be provided on the chip shown in FIG. 12 or may be provided on another chip in the optical scan device 100.

As shown in FIG. 12, an optical scan over a wide range can be achieved through a small-sized device by integrating all components on the chip. For example, all of the components shown in FIG. 12 can be integrated on a chip measuring approximately 2 mm by 1 mm.

Figure 13:
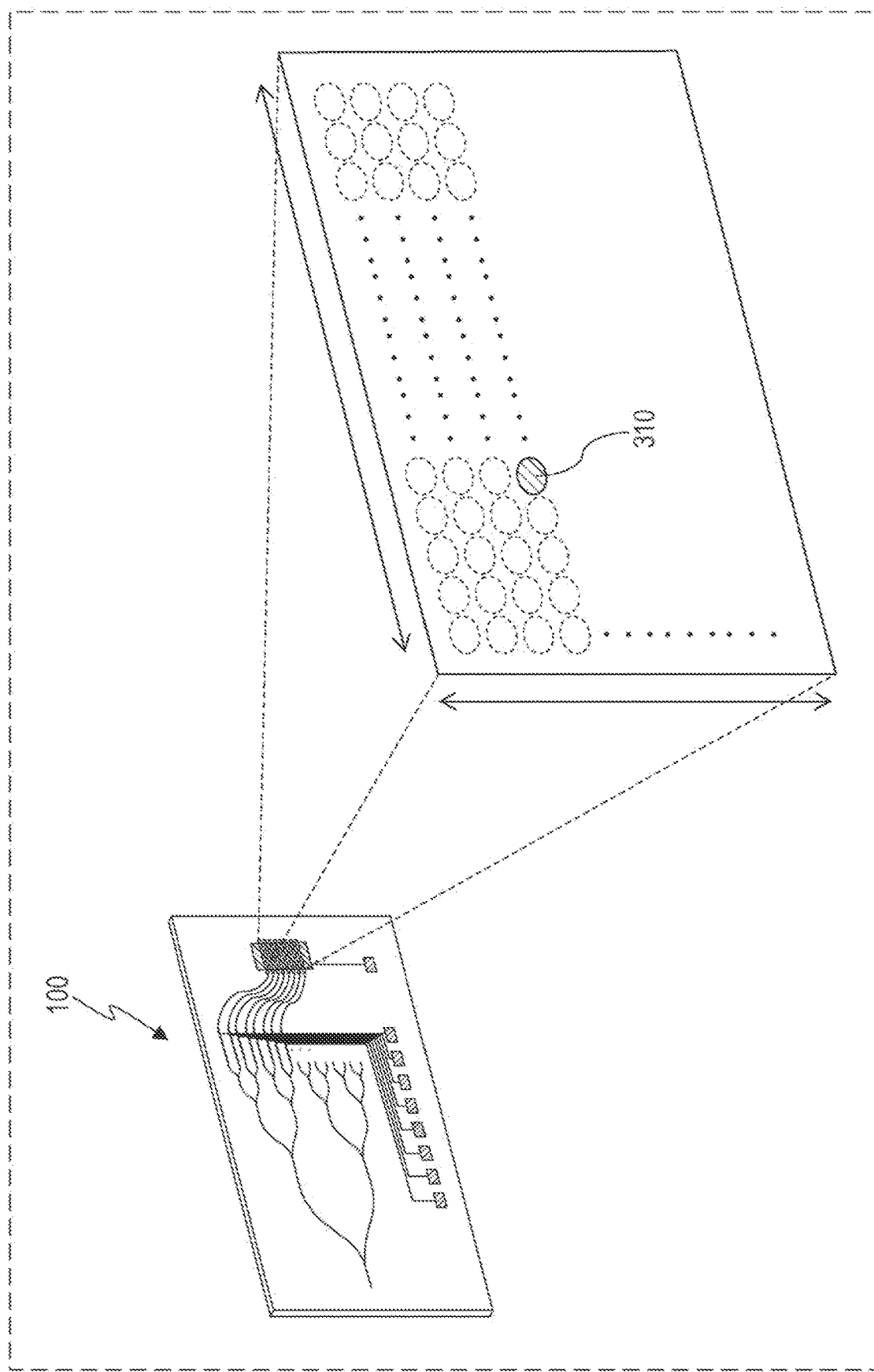
FIG. 13 is a schematic view showing how a two-dimensional scan is being executed by irradiating a distant place with a light beam such as a laser from the optical scan device.

FIG. 13 is a schematic view showing how a two-dimensional scan is being executed by irradiating a distant place with a light beam such as a laser from the optical scan device 100. A two-dimensional can is executed by moving a beam spot 310 in horizontal and vertical directions. For example, a two-dimensional ranging image can be acquired by a combination with a publicly-known TOF (time-of-flight) method. The TOF method is a method for, by observing light reflected from a physical object irradiated with a laser, calculating the time of fight of the light to figure out the distance.

Figure 14:
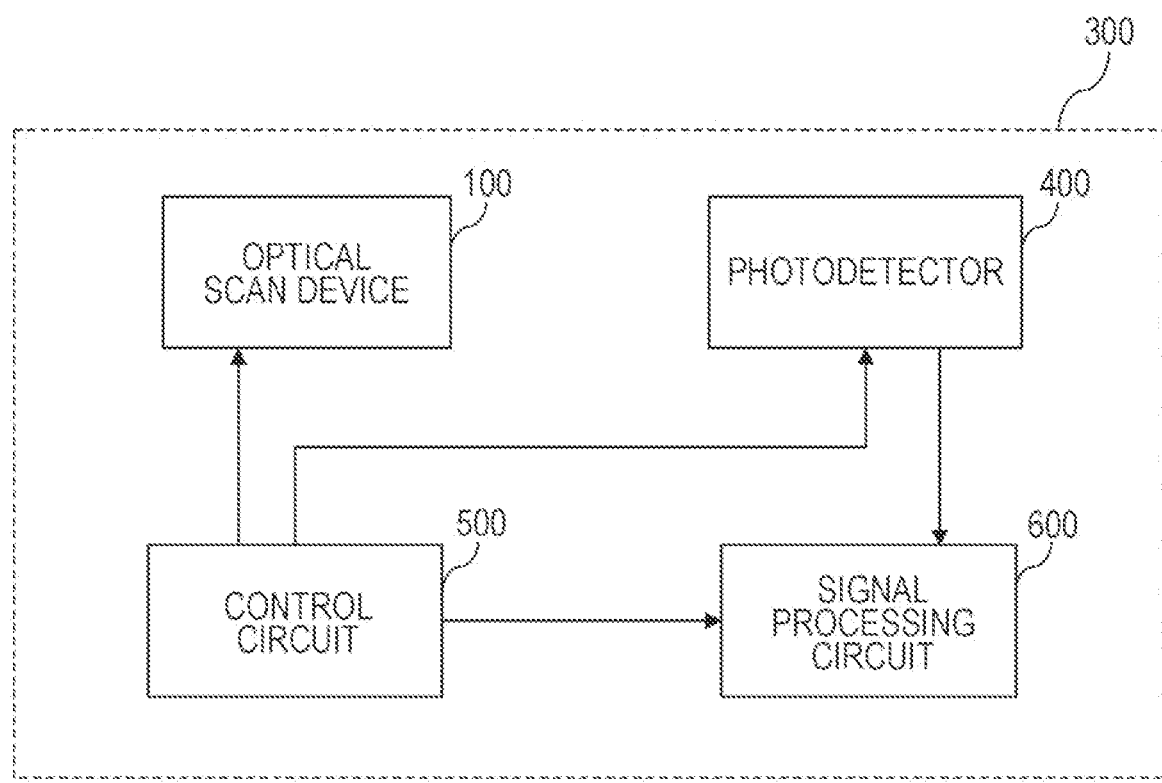
FIG. 14 is a block diagram showing an example configuration of a LiDAR system that is capable of generating a ranging image.

FIG. 14 is a block diagram showing an example configuration of a LiDAR system 300 serving as an example of a photodetection system that is capable of generating such a ranging image. The LiDAR system 300 includes an optical scan device 100, a photodetector 400, a signal processing circuit 600, and a control circuit 500. The photodetector 400 detects light emitted from the optical scan device 100 and reflected from a physical object. The photodetector 400 may for example be an image sensor that has sensitivity to the wavelength λ of light that is emitted from the optical scan device 100 or a photodetector including a photo-sensitive element such as a photodiode. The photodetector 400 outputs an electrical signal corresponding to the amount of light received. The signal processing circuit 600 calculates the distance to the physical object on the basis of the electrical signal outputted from the photodetector 400 and generates distance distribution data. The distance distribution data is data that represents a two-dimensional distribution of distance (i.e. a ranging image). The control circuit 500 is a processor that controls the optical scan device 100, the photodetector 400, and the signal processing circuit 600. The control circuit 500 controls the timing of irradiation with a light beam from the optical scan device 100 and the timing of exposure and signal readout of the photodetector 400 and instructs the signal processing circuit 600 to generate a ranging image.

The frame rate at which a ranging image is acquired by a two-dimensional scan can be selected, for example, from among 60 fps, 50 fps, 30 fps, 25 fps, 24 fps, or other frame rates, which are commonly used to acquire moving images. Further, in view of application to an onboard system, a higher frame rate leads to a higher frequency of acquisition of a ranging image, making it possible to accurately detect an obstacle. For example, in the case of a vehicle traveling at 60 km/h, a frame rate of 60 fps makes it possible to acquire an image each time the vehicle moves approximately 28 cm. A frame rate of 120 fps makes it possible to acquire an image each time the vehicle moves approximately 14 cm. A frame rate of 180 fps makes it possible to acquire an image each time the vehicle moves approximately 9.3 cm.

The time required to acquire one ranging image depends on the speed of a beam scan. For example, in order for an image whose number of resolvable spots is 100 by 100 to be acquired at 60 fps, it is necessary to perform a beam scan at 1.67 μs per point. In this case, the control circuit 500 controls the emission of a light beam by the optical scan device 100 and the storage and readout of a signal by the photodetector 400 at an operating speed of 600 kHz.

Example of Application to Optical Receiver Device

Each of the optical scan devices of the present disclosure can also be used as an optical receiver device of similar configuration. The optical receiver device includes a waveguide array 10A which is identical to that of the optical scan device and a first adjusting element that adjusts the direction of light that can be received. Each of the first mirrors 30 of the waveguide array 10A transmits light falling on a side thereof opposite to a first reflecting surface from the third direction. Each of the optical waveguide layers 20 of the waveguide array 10A causes the light transmitted through the first mirror 30 to propagate in the second direction. The direction of light that can be received can be changed by the first adjusting element changing at least one of the refractive index of the optical waveguide layer 20 of each waveguide element 10, the thickness of the optical waveguide layer 20 of each waveguide element 10, or the wavelength of light. Furthermore, in a case where the optical receiver device includes a plurality of phase shifters 80 or 80a and 80b which are identical to those of the optical scan device and a second adjusting element that varies differences in phase among lights that are outputted through the plurality of phase shifters 80 or 80a and 80b from the plurality of waveguide elements 10, the direction of light that can be received can be two-dimensionally changed.

For example, an optical receiver device can be configured such that the light source 130 of the optical scan device 100 shown in FIG. 12 is substituted by a receiving circuit. When light of wavelength λ falls on the waveguide array 10A, the light is sent to the optical divider 90 through the phase shifter array 80A, is finally concentrated on one place, and is sent to the receiving circuit. The intensity of the light concentrated on that one place can be said to express the sensitivity of the optical receiver device. The sensitivity of the optical receiver device can be adjusted by adjusting elements incorporated separately into the waveguide array 10A and the phase shifter array 80A. The optical receiver device is opposite in direction of the wave number vector (in the drawing, the bold arrow) shown, for example, in FIG. 4. Incident light has a light component acting in the direction (in the drawing, the X direction) in which the waveguide elements 10 extend and a light component acting in the array direction (in the drawing, the Y direction) of the waveguide elements 10. The sensitivity to the light component acting in the X direction can be adjusted by the adjusting element incorporated into the waveguide array 10A. Meanwhile, the sensitivity to the light component acting in the array direction of the waveguide elements 10 can be adjusted by the adjusting element incorporated into the phase shifter array 80A. θ and $α_0$ shown in FIG. 4 are found from the phase difference Δφ of light and the refractive index $n_w$ and thickness d of the optical waveguide layer 20 at which the sensitivity of the optical receiver device reaches its maximum. This makes it possible to identify the direction of incidence of light.

The aforementioned embodiments can be combined as appropriate.

Finally, the aforementioned optical device is summarized in the following items.

An optical device according to a first item includes a first waveguide extending in a first direction and a second waveguide connected to the first waveguide. The second waveguide includes a first mirror having a first reflecting surface, a second mirror having a second reflecting surface facing the first reflecting surface, and an optical waveguide layer, sandwiched between the first mirror and the second mirror, that contains a portion of the first waveguide including a leading end. At least either the first waveguide or the second waveguide has one or more gratings in a part of a connection region in which the first mirror, the second mirror, and the first waveguide overlap one another when seen from an angle parallel with a direction perpendicular to the first reflecting surface. The one or more gratings is at a distance that is longer than at least either a thickness of the first mirror or a thickness of the second mirror in the first direction from an end of the first mirror or the second mirror that is in the connection region.

In this optical device, even if an incline(s) is/are formed at an end(s) of the first mirror and/or the second mirror that is/are close to the connection region, light propagating through the first waveguide can be coupled to the second waveguide via the gratings with high efficiency without being influenced by the incline(s).

An optical device according to a second item is directed to the optical device according to the first item, wherein the connection region includes a first region extending from the end to the one or more gratings and a second region in which the one or more gratings are present. A sum of a length of the first region in the first direction and a length of the second region in the first direction is shorter than a shorter one of a half of a length of the first mirror and a half of a length of the second mirror.

This optical device, makes it possible to reduce an influence exerted on an optical coupling from the first waveguide to the second waveguide by a defect and/or a particle that occur(s) inside the optical waveguide layer.

An optical device according to a third item is directed to the optical device according to the first or second item, wherein a distance from the end to the one or more gratings is longer than a distance required for an intensity of light propagating along the first direction through the second waveguide to be attenuated to 1/e, where e is the base of a natural logarithm.

In this optical device, when the light propagating through the first waveguide is not coupled to the second waveguide via the gratings, a portion of the light propagates in a direction from the second waveguide toward the first waveguide through a part of the optical waveguide layer that is in the connection region. As a result, the portion of the light is emitted backward from the first mirror and/or the second mirror.

An optical device according to a fourth item is directed to the optical device according to any of the first to third items, wherein a transmittance of the first mirror is higher than a transmittance of the second mirror. A portion of light inputted from the first waveguide to the optical waveguide layer of the second waveguide is emitted via the first mirror.

In this optical device, light is emitted via the first mirror.

An optical device according to a fifth item is directed to the optical device according to any of the first to fourth items, wherein assuming that net is an effective index of a waveguide mode of the light propagating through the first waveguide and $\lambda$ is a wavelength of light in air, a period of each of the one or more gratings is greater than $\lambda/n_{e1}$ and less than $\lambda/(n_{e1}-1)$.

In this optical device, setting the period of each of the gratings as appropriate allows the light propagating through the first waveguide to be coupled to the second waveguide via the gratings with high efficiency.

An optical device and an optical receiver according to the present disclosure are applicable, for example, to a use such as a LiDAR system that is mounted on a vehicle such as an automobile, a UAV, or an AGV.

What is claimed is:

1. An optical device comprising:
a first waveguide extending in a first direction; and
a second waveguide connected to the first waveguide, the second waveguide including
a first mirror having a first reflecting surface,
a second mirror having a second reflecting surface facing the first reflecting surface, and
an optical waveguide layer between the first mirror and the second mirror, that contains a portion of the first waveguide including a leading end,
wherein
at least either the first waveguide or the second waveguide has one or more gratings in a part of a connection region in which the first mirror, the second mirror, and the first waveguide overlap one another when seen from an angle parallel with a direction perpendicular to the first reflecting surface, and
the one or more gratings is at a distance that is longer than at least either a thickness of the first mirror or a thickness of the second mirror in the first direction from an end of the first mirror or the second mirror that is in the connection region.

2. The optical device according to claim 1, wherein
the connection region includes a first region extending from the end to the one or more gratings and a second region in which the one or more gratings are present, and
a sum of a length of the first region in the first direction and a length of the second region in the first direction is shorter than a shorter one of a half of a length of the first mirror and a half of a length of the second mirror.

3. The optical device according to claim 1, wherein a distance from the end to the one or more gratings is longer than a distance required for an intensity of light propagating along the first direction through the second waveguide to be attenuated to 1/e, where e is the base of a natural logarithm.

4. The optical device according to claim 1, wherein
a transmittance of the first mirror is higher than a transmittance of the second mirror, and
a portion of light inputted from the first waveguide to the optical waveguide layer of the second waveguide is emitted via the first mirror.

5. The optical device according to claim 1, wherein assuming that net is an effective index of a waveguide mode of the light propagating through the first waveguide and $\lambda$ is a wavelength of light in air, a period of each of the one or more gratings is greater than $\lambda/n_{e1}$ and less than $\lambda/(n_{e1}-1)$.

* * * * *